US012769950B1

(12) United States Patent
Zhang et al.

(10) Patent No.: US 12,769,950 B1
(45) Date of Patent: Oct. 20, 2026

(54) MICROSERVICE SEMANTIC DETERMINATION BY A MODEL

(71) Applicant: Amazon Technologies, Inc., Seattle, WA (US)

(72) Inventors: Jiangtao Zhang, Pleasanton, CA (US); Ramu Panayappan, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 201 days.

(21) Appl. No.: 18/622,586

(22) Filed: Mar. 29, 2024

(51) Int. Cl.
*G06F 40/30* (2020.01)

(52) U.S. Cl.
CPC .................................... *G06F 40/30* (2020.01)

(58) Field of Classification Search
CPC ...................................................... G06F 40/30
See application file for complete search history.

(56) References Cited

U.S. PATENT DOCUMENTS

2023/0084685 A1* 3/2023 Tamilselvam ............ G06F 8/72 717/123
2025/0103300 A1* 3/2025 Le ........................... G06F 40/40
2025/0200296 A1* 6/2025 Li ........................... G06F 40/40

OTHER PUBLICATIONS

"PanRep: Graph neural networks for extracting universal node embeddings in heterogeneous graphs" Ioannidis, et al. arXiv:2007.10445v2 [cs.LG] Mar. 4, 2021; 12 pages.

* cited by examiner

*Primary Examiner* — Bhavesh M Mehta
*Assistant Examiner* — Joseph J. Yamamoto
(74) *Attorney, Agent, or Firm* — Perilla Knox & Hildebrandt LLP; Thomas B. Hildebrandt

(57) ABSTRACT

Techniques for automatically determining semantic information for portions of data using a large language model (LLM) and a machine learning model are discussed herein. For example, the LLM can receive initial input data representing a data string, byte slice, or computer-readable instructions, and output descriptions for different portions of the input data. The machine learning model can receive at least some of the descriptions output by the LLM, and determine one or more clusters of different portions. Each cluster can represent a business domain category, or microservice, for decomposing or otherwise modifying the initial input data. The techniques can include determining descriptions for each of the clusters to convey which microservices may be used in a microservice architecture. The techniques can include determining semantic meanings for microservices usable for application decomposition.

20 Claims, 9 Drawing Sheets

MICROSERVICE SEMANTIC DETERMINATION BY A MODEL

BACKGROUND

Cloud-based computing environments may provide many different types of services to subscribers, such as on-demand computing services, data-management services, software-execution services, application-hosting services, and various other types of services. Due to the ease of having the serverless computing environment provide and manage the computing infrastructure on behalf of subscribers, users continue to utilize cloud-based networks to provide and/or host services that are accessible over the Internet.

DETAILED DESCRIPTION

Figure 1:
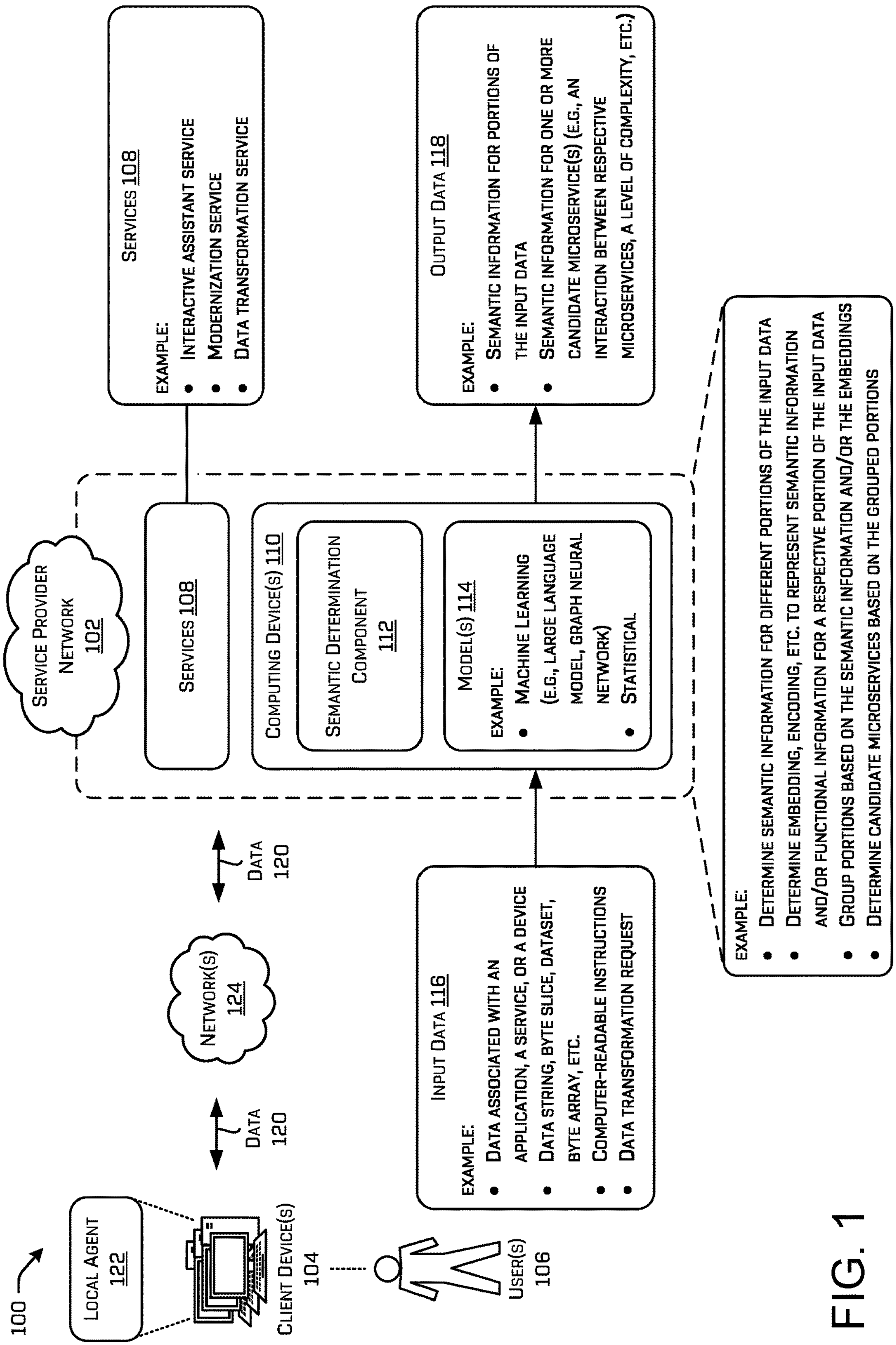
FIG. 1 illustrates a system-architecture diagram of an example environment for determining semantic information by an example computing device associated with a service provider network.

Many enterprises today are pivoting to microservices architectures to increase agility and scalability of their applications. However, decomposing a large monolithic application into well-designed microservices remains a challenge. Current approaches often rely solely on code structure analysis, ignoring the underlying business domains and capabilities present in the codebase. This can lead to microservices that are not optimally aligned with the true business domains, resulting in tight coupling, scalability issues, and difficulty in future maintenance and evolution of the system. There is a need for techniques that can semantically analyze application code to discover the inherent business domains and capabilities, enabling a domain-driven approach to microservice decomposition.

The present disclosure addresses these challenges, among others, by leveraging large language models (LLMs) to facilitate domain-driven microservice decomposition of monolithic applications. Using natural language processing, the disclosed techniques can extract rich semantic information about business domains, capabilities, and relationships directly from source code and associated artifacts. This allows enterprises to decompose applications into microservices that are cleanly aligned with true business boundaries-improving agility, scalability, and maintainability. The semantic business domain knowledge distilled by LLMs enables development teams to make intelligent, insight-driven decisions on microservice boundaries from the start, avoiding expensive rework later. This AI-powered approach unlocks domain-driven design principles at scale for enterprises modernizing their applications.

One implementation employs a three-stage process to extract semantic business domains from application code. In the first stage, the source code (for example, of each class) is input into a LLM which generates text summaries describing the functionality, effort level, and semantics of the code segments, while a sentence transformer model produces complementary sentence embeddings encoding semantic information. These embeddings are leveraged as initial node features which are then refined through a graph neural network (GNN) model node representation learning, to generate final node embeddings capturing both semantic and structural information for each code segment. The second stage involves unsupervised clustering of the code embeddings from stage one using algorithms like K-means, where the LLM performs semantic analysis to recommend the optimal number of business domain-aligned clusters to use as a target for the unsupervised clustering algorithms. This results in unnamed clusters grouping together similar code segments based on their embeddings. In the third stage, the LLM is leveraged again to consolidate and summarize the code segments within each cluster into coherent business domain topics. Where clusters contain too much code to fit the LLM's context window, an iterative process breaks them into batches for incremental summarization. The end result is a set of well-defined, human-interpretable business domains derived directly from the application's implemented logic and capabilities as extracted by the LLM.

The combination of the LLM, clustering, and GNN in the above-described implementation produces several benefits. For example, the quality of embeddings can impact clustering results, and so it is desirable to ensure that the embeddings capture the relevant code semantics. LLMs are suitable for understanding code classes context, semantic, patterns, and level of efforts. However, considering structural dependency information can also be helpful. GNN approaches are useful for understanding code classes in the context of their structural relationships, which are their inter-dependencies. The disclosed combination of using both the LLM and GNN to generate embeddings beneficially enables the embeddings to capture both semantic and topology information when representing a code segment.

Accordingly, this disclosure relates to techniques for automatically determining semantic information for portions of data using a large language model (LLM) and a clustering model. For example, the LLM can receive input data representing a data string, byte slice, or computer-readable instructions, source code, code snippets, etc. and output semantic information for different portions of the input data. The clustering model can receive at least some of the semantic information output by the LLM, and group some of portions of the input data into one or more clusters based on the semantic information. Each cluster can represent a business domain category, or microservice, for decomposing or otherwise modifying the input data. The techniques can also or instead include determining descriptions for the one or more clusters to convey human-readable descriptions for microservice(s) that are usable in a microservice architecture to modify the input data. By implementing the techniques described herein, a system can migrate, transform, convert, or otherwise modify data more quickly and with more accuracy, and perform such operations independent of requiring human input.

The semantic determination techniques can, for example, include a system configured to determine semantic information (e.g., function, meaning, etc.) for portions of computer-readable instructions, and identify which portions to process together as a microservice based on the semantic information of the different portions. For example, the system can receive application data associated with an application, identify segments of the application data, and determine descriptions for the segments of the application data. The descriptions can describe a function or a meaning of a respective segment, and the system can cluster segments into one or more clusters based on the descriptions. The one or more clusters can represent microservice(s) for processing the application data at a later time. The system can, in various examples, output a human-readable name (e.g., three to five words) for the clusters which are presentable in a user interface or on a display device to convey which groups of segments to process by a processor at substantially a same time in the future. A cluster can represent a business domain category, a microservice, or the like, and processing the segments of each cluster collectively can improve an overall time to modify the application data (e.g., convert to another version, transform to another data format, migrate to a cloud-computing environment, etc.).

In some examples, a client device can send application data to the system with a request to modify the application data, such as to determine a new data format for the application to operate in a cloud computing environment associated with a service provider. The client device may exchange data with a first service associated with the service provider, such as an interactive assistant (e.g., an interface or machine learning model operating as a "chatbot"), which can transmit the data to the system (which can operate as a second service) for predicting how many microservices to use to convert the data to the new data format, and an approximation of the time and/or computational cost to perform the conversion. At least a portion of the data output by the system can be transmitted to the client device (e.g., via the first service) to provide details of modifying the application data. In various examples, semantic information output by the system can be used to identify which microservices optimize available computational resources in a microservice architecture, as described herein. The client device can, in some example, present the output data on a display device to present information about the microservices.

Continuing with the example above, the system can implement a first machine learning model (e.g., an LLM) to determine descriptions for segments of the application data (e.g., portions of computer-readable instructions, a data string, byte array, or the like). The LLM can provide semantic information to a second machine learning model (e.g., a graph neural network (GNN)) which outputs different and/or additional semantic descriptions for the segments and/or for a group of segments. In some examples, the first machine learning model can determine an embedding, an encoding, or other data structure to represent the semantic information for input into the second machine learning model. The semantic determination techniques can include determining descriptions for portions of application data (e.g., computer-readable instructions) thereby enabling improved grouping of the portions based on the descriptions for decomposing the application. By identifying the groupings and associated descriptions, the application can be decomposed in less time and using fewer computational resources (versus not using the techniques). For example, a service provider can implement a system or service to transform the application data from a first data format or platform to a second data format or platform based at least in part on the semantic information.

The system can represent or otherwise utilize a cloud platform that provides or hosts various types of services (also referred to as backend service). For instance, backend services may include a data transformation service, a modernization service, an advertising service, business-application services, financial-institution services, healthcare services, and so forth. Client devices often interact or access these backend services over a network, such as the Internet, using Application Program Interface (API) calls that define an operation or interaction that the client device is requesting be performed. For example, an application or agent may be running locally on a client device to watch a video, make a purchase, initiate a migration project, etc. Data associated with the cloud platform can be used as input data to one or more models as described herein.

An application programming interface (API) refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In various examples, functionality associated with the LLM and/or the GNN can be available as a service of the cloud (e.g., a service provided by a service provider, a third-party service, etc.) and called via an API. For example, functionality associated with the system can be included in or otherwise provided in association with a vendor providing a service available over a network.

The system can employ a variety of different models to perform the semantic determination techniques described herein. As described herein, a model may be representative of a machine learning model, a statistical model, a heuristic model, or a combination thereof. That is, a model may refer to a machine learning model that learns from a training dataset to improve accuracy of an output (e.g., a prediction, a pattern, etc.). Additionally or alternatively, a model may refer to a statistical model that is representative of logic and/or mathematical functions that generate approximations which are usable to make predictions.

In some examples, the system can represent a mainframe modernization service, a data transformation service, or the like, to manage data associated with a service provider network. For example, the system can comprise a computing device configured to efficiently convert, migrate, transform, or modify data by using fewer computational resources and completing the migration in less time and with little or no human input than conventional approaches. The techniques can be used, for example, to determine which portions or segments of input data to process as a same entity, or microservice, to save time and computational resources to modify the input data. For example, semantic descriptions for segments output by a first model can enable improved grouping of the segments by a second model. Names for each grouping can be output to a user interface for conveying a data migration strategy (e.g., a number of microservices, a name of a microservice, etc.)

In various examples, the service provider network may comprise clusters of managed servers stored in data centers located across geographic areas. The service provider network may be a distributed network through which users (often customers) may interact via respective client devices to manage or otherwise interact with services provided by the service provider network, including employing a mainframe modernization service, a data transformation service, just to name a few.

Generally, a microservice can represent a business domain associated with one or more classes, and each microservice of the microservices could be scaled, maintained, deployed, and/or operated independently. An application can be "modernized" by enabling application data operable in a first environment (e.g., a mainframe environment) to transform for use in a second environment (e.g., a cloud-computing environment) by using a microservices architecture. Microservices are typically determined based on receiving input from a user of a client device that validates a set of initial candidate microservices (e.g., determines a number of microservices, names a microservice, etc.). Using the techniques described herein, an optimal number and type of candidate microservices can be determined automatically based on the semantic information from one or more models.

The techniques discussed herein can improve functioning of a computing device in a variety of ways. For example, the computing device can implement a model or component to reduce an amount of data transmitted over a network to manage data being converted, transformed, migrated, or otherwise modified from a first format to a second format. In some examples, the techniques described herein can improve the quality of data transmitted using a service provider network by reducing an amount and/or number of data exchanges to convert an application, for example (e.g., by using an optimized number and type of microservices that are based on descriptions from an LLM).

The techniques described herein can improve functioning of a computing device by providing a scalable and efficient method for predicting descriptions for portions of input data. For example, data output by the computing device can be generated in less time and provide more accurate semantic information for available computational resources (e.g., an amount of memory and/or processor resources) compared to not implementing the model or components. For example, the techniques provide an improved understanding of the portions of input data by assigning semantic information describing a function, meaning, a level of processing required by a memory and/or a processor, etc.

In some examples, the computing device can implement a model or component to optimize use of available network bandwidth and/or computational resources when identifying related or similar functioning segments of data. The techniques can, for instance, include the model or the component optimizing available computational resources by performing operations that limit the impact on the available resources (e.g., groups determined from the semantic information can be processed in less time that groups determined without consideration to the semantic information). The computing device may also receive fewer inputs from a client device or user to determine segments of input data, identify a microservice, name a microservice, and so on, thereby freeing up computational resources, network bandwidth, etc. for further or additional processing by the computing device. For example, a user can provide interest in data migration or data conversion while interacting with an interactive assistant service, and the computing device can provide domain specific entities (e.g., microservices) for the client device to complete data migration or conversion. In some examples, the computing device can cause another device to receive and present microservices usable for data conversion in a microservice architecture.

Certain implementations and examples of the disclosure will now be described more fully below with reference to the accompanying figures, in which various aspects are shown. However, the various aspects may be implemented in many different forms and should not be construed as limited to the implementations set forth herein. The disclosure encompasses variations of the examples, as described herein. Like numbers refer to like elements throughout.

FIG. 1 illustrates a system-architecture diagram of an example environment 100 for determining semantic information by an example computing device associated with a service provider network. For example, a service provider network 102 can exchange data with one or more client devices 104 (also referred to as "the client device 104" or "the client devices 104") associated with one or more users(s) 106. As shown, the service provider network 102 comprises services 108 and one or more computing device(s) 110 that further comprise a semantic determination component 112 and one or more model(s) 114 (also referred to as "the model 114" or "the models 114").

The computing device(s) 110 can represent functionality to determine semantic information for portions of input data (e.g., tags, labels, identifiers, words, etc. for segments of computer-readable instructions associated with an application). The computing device(s) 110 can further process the semantic information, in various examples, to identify which portions of the input data to associate as a "microservice" for converting, transforming, decomposing, or otherwise modifying the input data. For example, the client device 104 can provide an indication to modify data associated with an application (e.g., convert code from a first operating system to a second operating system, transform data to another data format for use by another system, environment, or computing device, etc.) to one of the services 108, such as an assistant service, data transformation service, or the like.

In some examples, the client device 104 can send a request to migrate data associated with an application to one or more of the services 108, and the computing device(s) 110 can provide the client device 104 information describing which candidate microservices are available to migrate the data. For example, the computing device(s) 110 can receive application data for migration from the client device 104, determine semantic information describing portions or segments in the application data, and determine relationships among the portions or segments based on the semantic information. The computing device(s) 110 can, for example, determine microservices to migrate the data based on the relationships determined from the semantic relationships.

In various examples, the semantic information determined by the computing device(s) 110 can describe a function and/or a meaning of different portions of input data. The semantic information can, for example, describe a segment of computer-readable instructions, a data field type, information in a data field, human-readable metadata, computer-readable metadata, or a creation time, just to name a few. In various examples, the output data 118 can represent semantic information for a first segment of the input data, a group of segments, an embedding representing the first segment, etc. In some examples, the output data 118 can represent natural language summaries for one or more of the portions of segments. By providing the semantic information as described herein, an optimal number of microservices can be identified for migrating the data while making efficient use of available computational resources. In this way, an application can be migrated in less time and using fewer computation resources that determining microservices for an application without the semantic information.

The semantic information can, for example, describe a segment of computer-readable instructions, a data field type, information in a data field, human-readable metadata, computer-readable metadata, or a creation time, just to name a few. In various examples, the output data 118 can represent semantic information for a first segment of the input data, a group of segments, an embedding representing the first segment, etc. In some examples, the output data 118 can represent semantic information associated with one or more candidate microservices. The output data 118 may represent an interaction between a first candidate microservice and a second candidate microservice such as a shared computational resource, data format, class, etc. The output data 118 may also or instead describe a level of complexity to transform the input data 116 to another data format, platform, environment, or the like such as how many microservices to use in a transformation project and/or processing times for individual microservices, and so on.

In various examples, the computing device(s) 110 can implement the semantic determination component 112 and/or the model(s) 114 to receive a variety of input data 116 for processing, and determine output data 118. For instance, the computing device(s) 110 can receive a request to transform data associated with the client device 104 in a first environment (e.g., a mainframe computer in a mainframe environment) to a second environment (e.g., a cloud-computing device in a cloud-computing environment), among others.

In some examples, the client device(s) 104 can exchange data 120 with the services 108 and/or the computing device(s) 110 of the service provider network 102. In various examples, the client device(s) 104 can include a local agent 122 representing an interface for interacting with the user 106 (e.g., outputting data for presentation, receiving data from the user 106, and so on). The data 120 can vary in examples and can represent first data from the client device 104 for processing by the computing device(s) 110 (e.g., a request to transform data, preferences for modify data, data for modifying, etc.) or second data from the computing device(s) 110 for output by the local agent 122, just to name a few.

In various examples, the data 120 can represent or include the input data 116 and/or the output data 118, application data, storage data, data migration information, etc. The data 120 can, for instance, be associated with a data transformation service and/or a modernization service. The data 120 can include data from the client device 104 for analysis by the semantic determination component 112, data from the database 212, and/or service data associated with one or more of the services 108, depending on examples.

In some examples, the service provider network 102 may comprise clusters of managed servers stored in data centers located across geographic areas. The service provider network 102 may be a distributed network through which users (often customers) may interact via the client device 104 to manage or otherwise interact with services 108 provided by the service provider network 102. The service provider network 102 may be managed by a service provider, and may provide various types of services 108, such as an interactive assist service, a modernization service, a data transformation service, a video service, an on-demand computing service, an advertising service, a message-queuing service, a managed-database service, a software-execution service, application-hosting services, business-application services, financial-institution services, and/or other services. The services 108 may be a collection of computing resources configured to instantiate VM instances, containers, network functions, etc., and to provide other types of computing resources on demand. Other applications for the services 108 may be to support database applications, electronic commerce applications, business applications and/or other applications.

In various examples, functionality associated with the computing device(s) 110 can be provided to the client device 104 as one of the services 108, such as a data transformation service to transform or convert data between respective formats, operating systems, platforms, or the like. The client device 104 may, in examples, interact with a service other than the data transformation service (e.g., an interactive assistant service), and the other service can invoke the data transformation service to determine semantic information for data to be transformed independent of the client device 104 sending a request to use a particular service. That is, interactions with a service by the client device 104 (or user 106) can cause the service to send data for converting, transforming, or modifying to the computing device(s) 110 for performing one or more operations discussed herein. In this way, the computing device(s) 110 can, for example, provide second data to the client device 104 indicating candidate microservices that may be used to transform the data for use in another environment, and optionally an estimated time to complete the data transformation (e.g., by predicting processing times for the candidate microservices based on available computational resources). By providing the second data to the client device 104 (or the user 106), candidate microservices for transforming the data can be presented on a display device and/or be interacted with by a user via an interface.

The client device(s) 104 may represent any type of computing device capable of connecting to the service provider network 102 via a suitable data communications network(s) 124 (e.g., a third-party network) such as, but not limited to, a laptop or desktop computer, a tablet computing device, a mainframe computer, a television, a server computer, a vehicle, a watch, a wearable device (sunglasses), or a mobile telephone, just to name a few. Administrative users employed by the operator of the service provider network 102, such as administrators managing the operation of the service provider network 102, might also connect with, manage, and utilize resources provided by the service provider network 102 in a similar fashion (e.g., using the computing device(s) 110).

According to the techniques described herein, user(s) 106 of the service provider network 102 may subscribe for an account with the service provider network 102 to utilize the computing infrastructure (e.g., computing resources in data centers) supporting the services 108 (e.g., memory, processing power, auto-scaling, networking and content delivery, etc.) provided for and managed by the service provider network 102. The service provider operating the service provider network 102 may charge a fee for utilization of the computing resources to a subscriber that have computing resources provisioned to support and use the services 108.

Generally, the user(s) 106 may interact via the local agent 122 to receive or employ a service from the services 108. The user(s) 106 may be one or more of individual users, groups of users, organizations, businesses, or other entities that interact with the service provider network 102 via respective client device(s) 104. In some examples, the local agent 122 can represent software that is associated with the services 108. The local agent 122 may also, or instead, represent a user interface having one or more controls (or input controls) for the user 106 to provide input usable by the semantic determination component 112 to generate, update, or otherwise output data transfer progress associated with the service provider network 102. For instance, the user 106 can provide input to one or more controls of the local agent 122 to log into a service and/or provide preferences related to a presentation (e.g., the data 120) on a display device of the client device(s) 104.

The services 108 and/or the microservices, may be provided in one particular implementation by one or more data centers operated by the service provider. As known to those skilled in the art, data centers are facilities utilized to house and operate computing resources, such as computer systems and associated components. Data centers may also include redundant power, communications, cooling, and security systems. The data centers might be located in geographically disparate regions, and might also be connected to various other facilities, such as co-location facilities, and various wide area networks ("WANs"), such as the Internet.

The computing resources associated with the services 108 and/or the microservices can be provisioned and de-provisioned as needed in an automated fashion. For example, the service provider network 102 might be configured to instantiate a new instance of a computing resource, such as a VM instance, in response to an increase in demand for a network service or other condition. Other types of computing resources might also be provisioned and de-provisioned in a similar manner. Services 108 in the service provider network 102 might also provide functionality for automatically scaling and/or de-scaling the computing resources based upon demand for the resources and/or other factors. In this way, the service(s) providing the techniques described herein can be scaled to amount for additional migration projects, detected equivalent data, and so on.

The semantic determination component 112 can, for example, represent functionality to determine semantic information for different portions of the input data 116 (e.g., a data string, byte slice, dataset, byte array, etc.) and/or semantic information for a group of such portions. For example, the semantic determination component 112 can determine descriptions for segments of computer-readable instructions, and provide the descriptions to the client device 104 to enable the client device 104 to "understand" the different portions of the input data. In some examples, the semantic determination component 112 can determine a name for portions of the input data that are grouped by class, function, or meaning into a candidate microservice for modifying the input data 116 at a later time. The semantic determination component 112 can, for example, identify a data value, a data field, or other portion of the input data 116, and determine a function, a class, and so on for each detected portion of the input data.

In various examples, the semantic determination component 112 may access a database (not shown) that stores data representing a previous output from the computing device(s) 110. In some examples, the database can store classifications, semantic information including functions and meanings of various portions or segments of the input data 116. The semantic determination component 112 can, in some examples, transmit data to the client device(s) 104 representing descriptions for various microservices. For example, the computing device(s) 110 can configure a message for sending to the client device 104 that includes data for presentation on a display device and/or in user interface such as the local agent 122. Additional detail of the semantic determination component 112 can be found throughout this disclosure.

By way of example and not limitation, a service provider can implement a mainframe modernization service (e.g., one or more of the services 108) in the service provider network 102 including receiving a request to migrate data from a mainframe computer to a cloud computing device. The mainframe modernization service may employ the semantic determination component 112 to determine information usable to determine candidate microservices for migrating the data using a microservice architecture.

In various examples, the model(s) 114 (e.g., a machine learning model, a graph model, a statistical model, heuristic model, or a combination thereof) can receive the input data 116 and/or data from another model or component as input for processing. In various examples, the model(s) 114 can a) determine semantic information, b) determine an encoding, embedding, or the like to represent the semantic information, c) group determined embeddings into clusters, and/or d) determine a name for an embedding, cluster, or the like. For example, a first model of the models 114 can group portions of the input data based on the semantic information and/or the embeddings, and a second model of the models 114 can associate each group with a candidate microservice. In some examples, the embedding can represent a vector of numerical values. In various examples, an embedding can represent a class, and a third model of the models 114 can compare embeddings one to another to determine a level of similarity between two respective classes. A fourth model of the models 114 can, for instance, cluster the embeddings into two or more clusters in which each cluster comprises some of the portions of the input data. A same or different model can determine a relatively short human-readable description (e.g. ten or fewer words) for a candidate microservice, for example. The computing device(s) 110 can implement one or more of the models 114 in any order, or at substantially a same time (e.g., the models 114 can perform at least some operations in parallel).

In some examples, the semantic determination component 112 can configure a message for sending to the client device(s) 104 to cause the client device(s) 104 to present at least some of the output data 118 in a user interface. In various examples, the user interface can present controls for interacting with semantic information, microservices, etc. The user interface may also or instead be used to receive data modification preferences for data sent from the client device(s) 104 (e.g., as the data 120).

Figure 2:
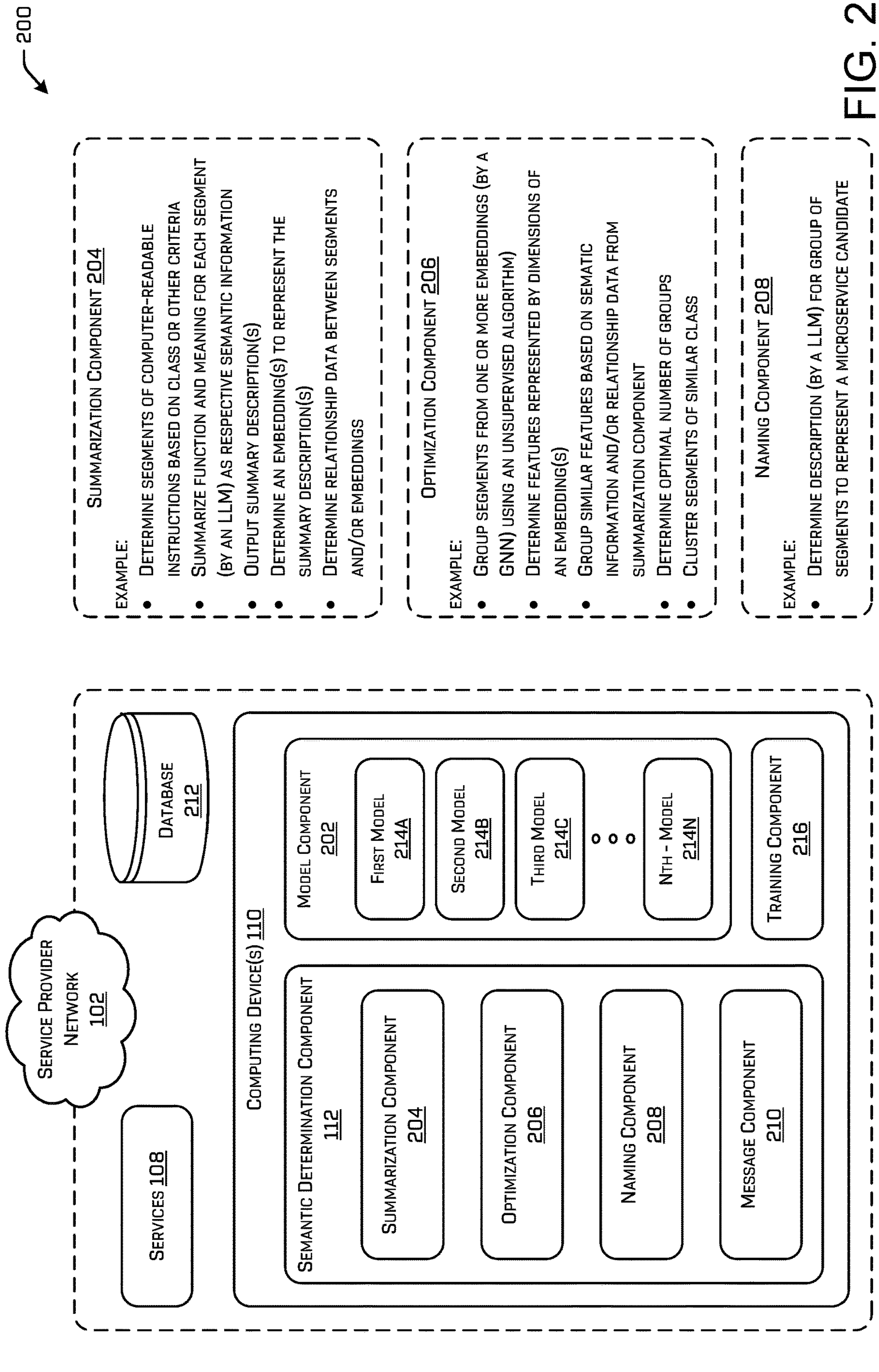
FIG. 2 illustrates a diagram of an example service provider network implementing example components to perform the techniques described herein.

The computing device(s) 110 can receive the input data 116 from one or more of: the services 108, the client device(s) 104, and/or a database (e.g., the database 212 of FIG. 2). The input data 116 can be aggregated from a variety of sources at a single time or over a time period and may include data associated with a service, a database, a device, or an environment. Additionally, or alternatively, the semantic determination component 112 can determine which time periods, sources, geographical regions, etc. to aggregate data for processing. The input data 116 may also or instead include data migration information such as preferences of a client for a level of risk or accuracy for the migrated data, etc.

In some examples, the input data 116 can represent application data associated with an application, historical data (e.g., associated with a user and/or the first device), and/or data migration preferences, just to name a few. The input data 116 can, in some examples, include service data associated with one or more services (e.g. the services 108). In various examples, the input data 116 can represent a portion of the data stream from a storage device (or receive the portion in real-time independent of the database), such as a data stream database that receives (and in some instances replicates) all data associated with the data stream (e.g., from the client device(s) 104).

In various examples, some or all of the output data 118 can be stored in a storage device as a "catalog" available to various devices. The stored description data can be updated, deleted, added, or otherwise managed over time to maintain a list of descriptions that can be provided to the various devices periodically and/or upon request. In examples when the client device provides an indication of a request to modify some provided data, the system can identify a related, existing candidate microservices from the stored data, and send information associated with the candidate microservices to the device(s). In this way, descriptions for portions of the input data can be provided to other devices in less time versus waiting for the system to perform the analysis responsive to individual requests and can do so without requiring further input from the device (e.g., from a developer or component of the client device to manually validate a description, write code, etc.).

Though FIG. 1 shows the semantic determination component 112 and the model(s) 114 separately for discussion purposes, functionality associated with the semantic determination component 112 or the model(s) 114 can be included in the semantic determination component 112, the model(s) 114, or another component or device of the service provider network 102. In some examples, the functionality associated with the semantic determination component 112 and/or the model(s) 114 can be included in the client device 104.

In some instances, the components and/or models described herein may comprise a pluggable component, such as a virtual machine, a container, a serverless function, etc., that is capable of being implemented in any service provider network and/or in conjunction with any API gateway.

FIG. 2 illustrates a diagram 200 of an example service provider network implementing example components to perform the techniques described herein. For example, the service provider network 102 can implement the computing device(s) 110 and the semantic determination component 112 of FIG. 1. As shown in FIG. 2, the computing device(s) 110 comprises a model component 202 and the semantic determination component 112 which further includes a summarization component 204, an optimization component 206, a naming component 208, and a message component 210. The service provider network 102 is further shown to include a database 212. Though depicted in FIG. 2 as separate components, the functionality associated with the model component 202, the summarization component 204, the optimization component 206, the naming component 208, and/or the message component 210 can be included in a different component associated with the service provider network 102. In various examples, the service provider network 102 (e.g., the computing device(s) 110) can exchange data with the client device(s) 104 over the network(s) 124 to implement the techniques described herein.

As shown in FIG. 2, the model component 202 includes one or more models, such as a first model 214A, a second model 214B, a third model 214C up to an Nth model 214N (collectively "models 214"), where N can be any integer greater than 1. The models 214 may be stored on, or otherwise accessible by, memory associated with the computing device(s) 110, such as the database 212. The models 214 may represent machine learning models, statistical models, heuristic models, or a combination thereof, and may be implemented in association with a component of the computing device(s) 110. In various examples, the model component 202 can include at least the functionality associated with the model(s) 114. For example, the first model 214A can represent an autoencoder that determines an embedding comprising segments of the input data.

The summarization component 204 can generate, initiate, update, or otherwise determine semantic information (e.g., tags, labels, identifiers, words, etc.) for different segments of the input data 116. For example, the summary can be a description (e.g., 120 words or less) of segments of computer-readable instructions associated with an application. In various examples, the summarization component 204 can also or instead determining semantic information for a cluster of segments, for an embedding, and so on.

In some examples, the summarization component 204 can employ a large language model to identify, detect, or determine a function and meaning for each segment of the input data 116. In various examples, the summarization component 204 can output descriptions to another model or component such as the optimization component 206, the naming component 208, and/or to a user interface associated with the client device(s) 104.

In some examples, the summarization component 204 can determine relationship data between segments of the input data 116, segments associated with respective embeddings, etc. The relationship data can include hierarchical data identifying a relationship among the first segment and one or more additional segments, and may be input into a machine learning model that determines clusters of segments based on the hierarchical data. In various examples, the hierarchical data can represent connectivity information between two or more segments. For example, the summarization component 204 can determine connection information between a first segment and a second segment based on analyzing the input data 116. In some examples, the summarization component 204 can determine connection information between the first segment and a neighbor of the second segment. The summarization component 204 can, for example, determine connection information between a first neighbor of the first segment and a second neighbor of the second segment. In various example, an output from the summarization component 204 can be transmitting to another component, model, or device for further processing (e.g., the message component 210 can configure a message for sending to the optimization component 206 that includes the output data). In some examples, another model can receive the output from the summarization component 204 as input data for classifying, clustering, grouping, or determining information as described herein.

The summarization component 204 can also or instead determine segments of computer-readable instructions based on criteria such as parsing a class identifier, class body, or other information associated with a segment. In some examples, a data transformation service (or other service) can receive the input data 116 and output the segments for sending to the summarization component 204. The segments of computer-readable instructions can be determined based on detecting a class identifier, a class body, a class dependency, or other detected data associated with the first segment of the second segment. In various examples, the summarization component 204 can determine a first description for the first segment and a second description for the second segment based at least in part on an LLM analyzing the class identifiers, the class bodies, the class dependencies, etc. associated with the first segment and/or the second segment.

The optimization component 206 can represent functionality to analyze data associated with the service provider network 102 such as semantic information output by the summarization component 204. In some examples, the optimization component 206 can implement a sentence transformer to determine text embeddings for one or more of the descriptions, summaries, or the like output by the LLM. Another model can receive the text embeddings (e.g., a GNN) and determine node embeddings to represent the input data 116. The node embedding may be associated with a particular class and/or represent a vector of numerical values to represent semantic information and topology information. The optimization component 206 can, in some examples, determine similarity between the node embeddings to reflect a similarity between a first class and a second class.

In various examples, the optimization component 206 can implement a GNN to classify, cluster, group, or otherwise associate segments from one or more embeddings into one or more clusters. In an example, the GNN can implement an unsupervised algorithm to determine features represented by dimensions of an embedding(s), and group similar features based on sematic information and/or relationship data from the summarization component 204. In some examples, the GNN can group the node embeddings into clusters based on receiving relationship data from the LLM indicating suggested groupings of segments based on analysis of the semantic descriptions. Additionally, or alternatively, the optimization component 206 can determine an optimal number of clusters, and output a computer-readable name for each of the clusters of different segments. For example, a number of clusters can be determined to optimize available computational resources, and a number of microservices may correspond to the number of determined clusters.

In some examples, the GNN can perform node representation learning based on one or more of the semantic embeddings and/or the initial features to generate or produce node embeddings for respective segments. For example, the GNN can determine semantic information and structural information for one or more node embeddings. In various examples, a clustering model can cluster the node embeddings to group the segments or portions associated with the node embeddings into one or more clusters. The clustering model can, in some examples, receive a target number of clusters based on semantic analysis from the LLM for determining the clusters. In various examples, the LLM can summarize business domain topics represented by respective clusters of code segments for output to a device (or user interface) to facilitate or cause decomposition of the input data into microservices that are aligned with the business domain topics.

The naming component 208 can represent functionality to provide a human-readable name for an output from the optimization component 206, such as generating a name for a segments, a cluster of segments, an embedding, or the like. In some examples, the naming component 208 can determine a description (by an LLM) for a group of segments output by the GNN. Each group or cluster of segments output by the LLM can represent a candidate microservice, and the naming component 208 can determine a title or topic for the groups or clusters which may also be referred to herein as a debrief. An example description can be found in the description of FIG. 3 below.

The message component 210 can represent functionality to generate, configure, or exchange a message between the computing device(s) 110 and another device such as the client device(s) 104. For example, the message component 210 can configure a message for sending to the client device(s) 104 based on an output from one or more components. The message can be included in the data 120 to notify the client device(s) 104 of candidate microservices. The message component 210 can also or instead generate a message for sending to a device to cause presentation related to a data migration project in an interface.

In various examples, the service provider network 102 can implement a database 212 to store various types of data. The database 212 can, for instance, store data associated with a component or model of the computing device(s) 110 for access at a later time. The database 212 can represent a storage device configured to store semantic data, embedding data, data migration preferences, etc. In various examples, one or more components can include or access the database 212 (e.g., and/or the database 508 of FIG. 5), a container registry, a memory, or other storage device to store the various types of data usable for implementing the techniques discussed herein. Some stored data can be used as input data (or training data) into a model (or machine learning model) as described herein.

In some examples, the first model 214A can determine a size of data to input into the semantic determination component 112 to make efficient use of available computational resources. For example, migrating an application can include moving data from a first environment to a second environment in stages. The first model 214A can represent a machine learning model trained to determine a size of a data string, dataset, data chunk, or the like for use as input including whether to process a batch workload and/or to perform transactional processing. In various examples, the second model 214B can detect different portion(s) of the input data 116 relative to another portion(s), and the third model 214C can semantically summarize the portions output by the second model 214B.

The computing device(s) 110 can include a training component 216 to provide functionality to train a machine learning model usable to implement one or more of the techniques discussed herein to determine semantic information, an embedding (text, node, or other), a cluster, a name for a microservice, etc. In some examples, the training component 216 can include training data that has been generated by one or more machine learning models or components described herein. For example, the training component 216 can receive cluster information, semantic information associated with related segments, the output data 118, etc. for use as training data (e.g., to improve detections, predictions, and/or classifications of such information over time). Third-party labeled training data can also or instead be used for training in various examples.

In some instances, a training component 216 may be executed by one or more processor(s) of a computing device to train a machine learning model based on training data. The training data may include a wide variety of data, such as segment names, embedding names, cluster names, microservices names, or a combination thereof, that is associated with a value (e.g., a classification of interest, inference, prediction, etc.). Such values may generally be referred to as a "ground truth." To illustrate, the training data may be used for determining semantic data for portions of a data string, a byte slice, a byte array, or the like. The semantic data may be associated with one or more classifications or determinations. In some examples, such a classification may be based on user input (e.g., user input indicating that the data depicts a specific field) or may be based on the output of another machine learning model.

In some examples, the training component 216 can train the LLM to improve accuracy of a field description (e.g., a prediction) over time by receiving training data describing various segment types, segment names, segment functions, segments examples, segments meanings, etc. The training component 216 can also or instead train a GNN to detect an optimal number of clusters by analyzing performance of microservices over time including historical adjustments to the number of microservices executed by a processor in a real-world environment (or in a simulation in a simulated environment).

Figure 3:
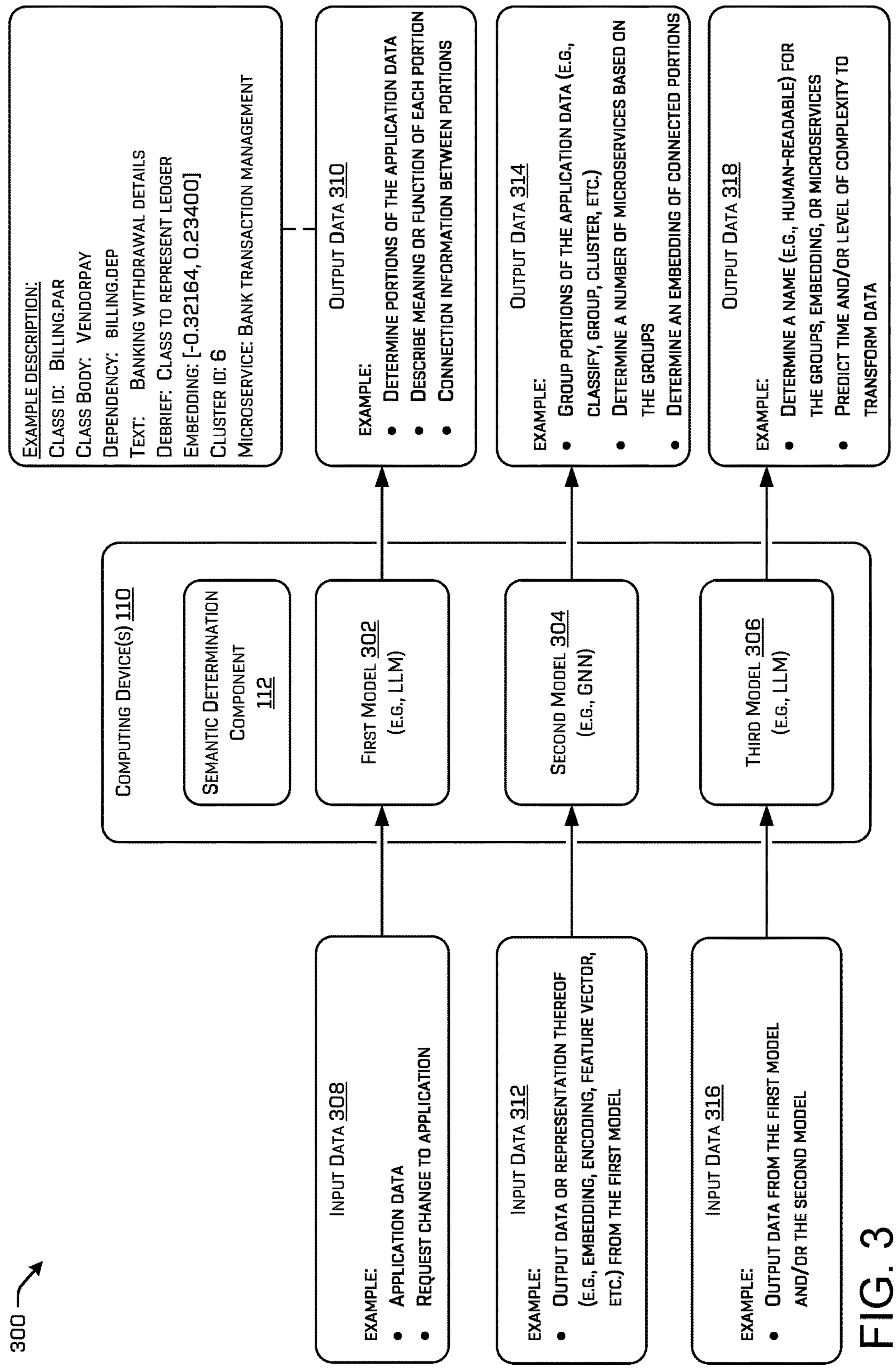
FIG. 3 illustrates a diagram of an example computing device implementing one or more models to determine semantic information for portions of input data as described herein.

FIG. 3 illustrates a diagram 300 of an example computing device implementing one or more models to determine semantic information for portions of input data as described herein. For example, the service provider network 102 can implement the computing device(s) 110 and the semantic determination component 112 of FIG. 1. As shown in FIG. 3, the computing device(s) 110 comprises a first model 302, a second model 304, and a third model 306 though other numbers of models can be implemented in other examples. In various examples, the first model 302, the second model 304, and/or the third model 306 can include the functionality described in relation to the model(s) 114, the model component 202 (or the models thereof). Though depicted in FIG. 3 as separate models, the functionality associated with the first model 302, the second model 304, and/or the third model 306 can be included in a different model, component, or device associated with the service provider network 102 (e.g., a single model or component).

In some examples, the first model 302 can receive input data 308 representing a dataset, a workload, or the like associated with an application of the client device(s) 104, and determine output data 310. The first model 302 can, for instance, represent a large language model that receives application data and determines a meaning, function, or purpose for segments of the application data. The application data can include computer-readable instructions for execution by a processor to invoke the functionality associated with the application. In some examples, the input data 308 can include a request to change an application from a first data format or platform to another data format or platform. In some examples, the input data 308 can include transformation preferences from a client device (or user thereof) such as a level of accuracy for transforming the data. The first model 302 can receive the input data 308, for example, from a storage device or as a data stream from the client device(s) 104.

In various examples, the first model 302 can generate semantic information for segments of the application data (e.g., a first portion and a second portion of the computer-readable instructions) and further determine an embedding, an encoding, a feature vector, or the like to represent the semantic information for the segments of the application data. In some examples, the first model 302 can determine a list of related segments based on respective semantic information (e.g., as relationship data), determine a subset of the related segments, and/or determine a hierarchy of related segments.

The second model 304 can, in some examples, receive input data 312 usable to generate output data 314. For example, the input data 312 can include the output data 310 from the first model 302 or a representation thereof such as an embedding, an encoding, a feature vector, etc. The second model 304 may also receive some or all of the input data 308 as the input data 312. In some examples, the second model 304 can implement an unsupervised algorithm (e.g., K-means, OPTICS, DBScan, just to name a few) to group segments into clusters based on the embeddings (or other output) from the first model 302. The second model 304 can, in various examples, determine clusters of different segments of the application data. The second model 304 can also or instead perform semantic analysis to generate or determine a number of clusters that is aligned with a particular business domain. For example, the second model 304 can determine business domains associated with various segments and determine the number of clusters to be equal to a number of business domains.

In some examples, the second model 304 can determine an embedding, an encoding, or other data structure representing an interaction, relationship, and/or connection between portions of the application data. The second model 304 can, for instance, further group the connection information output by the first model 302 and/or determine an embedding of connected portions as the output data 314.

The second model 304 can, in various examples, receive the list of related segments from the first model 302 as part of the input data 312, and determine one or more clusters of segments, one or more embeddings, or the like, based on the received list of related segments. For example, the output data 310 can include connection information indicating segments to group based on respective semantic descriptions which can be considered by the second model 304 when determining the clusters or embeddings thereby improving determination of which segments to include in a particular cluster or particular embedding. Additionally, or alternatively, the second model 304 can implement a clustering algorithm to group the input data 312.

In various examples, the third model 306 can receive input data 316 for processing to generate output data 318 representing a semantic summary of the input data 316 (e.g., a name for a cluster or microservice). The input data 316 can represent one or more of: output data from the first model 302, output data from the second model 304, application data, or other data. The third model 306 can, for instance, represent an LLM that is configured to determine which segments of input data are associated with a same coherent topic or business domain. By way of example and not limitation, the third model 306 can determine output data representing a name for one or more groups, embeddings, clusters, and/or microservices such as human-readable information (e.g., 3-5 words) summarizing the segments of a respective cluster. In various examples, the output data 318 can indicate a level of complexity to transform data using the candidate microservices (e.g., a processing capability or timeframe associated with respective candidate microservices, an overall time to complete processing for a set of candidate microservices, etc. At least some of the output data 118 may be presented on a display device (or user interface) to provide information usable for determining whether to initiate a data transformation project (e.g., by a computing device or user thereof). By outputting some of the output data 118 for display can enable a computing device (or user thereof) to determine financial and/or computational costs associated with the data transformation project. The information presented for display can, for example, include controls for a) interacting with a particular microservice to receive additional detail such as descriptions for segments or portions of data included in the particular microservice, or b) recommending changes related to a candidate microservice, just to name a few.

In some examples, the third model 306 can predict output data 318 representing a time to process each candidate microservice using available computation resources, and predict a time to transform the application data (e.g., from the first data format or platform to the second data format or platform, from a first version to a second version, or the like).

In some examples, a number or size of the data segments in a particular cluster may exceed the computational capabilities of the third model 306 (e.g., a cluster may be sufficiently large that the LLM is unable to receive the entire cluster as input), and the third model 306 can determine batches to represent different data segments, determine a summary for each batch, and then consolidate the summaries of the batches into distinct topics or business domains. In this way, the third model 306 can receive data for clusters of various size, identify a batch size and a number of batches for a cluster, and name the cluster with consideration to a name assigned to each batch. Though described in relation to the third model 306, the techniques may also or instead be performed by the first model 302 and/or the second model 304.

In various examples, the first model 302, the second model 304, and/or the third model 306 can be trained to determine relationships between respective semantic data associated with a segment and business domain descriptions. For example, a training component (e.g., the training component 216) can improve predicted semantic descriptions for a segment, embedding, cluster, etc. by learning semantic relationships between a segment and a business domain, the segment and a business domain, a set of segments and a business domain, a first business domain and a second business domain, and the like.

In some examples, the semantic determination component 112 can pre-process input data to improve or otherwise enable process by a model or component. For example, input data representing computer-readable instructions may be converted from a first data format to a second data format usable by a particular model. In this way, the input data can be associated with a data format, programming language, operating system, etc. usable by the model. In some examples, the semantic determination component 112 can prepare the computer-readable instructions for processing by a LLM by determining an amount of data and/or a type of data formatting that optimizes the available computational resources available to the LLM.

In various examples, one or more of the first model 302, the second model 304, or the third model 306 can be used to generate output data similar to the output data 118 of FIG. 1. In some examples, the message component 210 can configure, generate, and/or transmit a message comprising some or all of the output data (e.g., the output data 310, the output data 314, and/or the output data 318) for sending to another model, component, or device (e.g., the client device(s) 104). In various examples, the message can cause presentation of the output data on a display device or in a user interface.

Figure 4A:
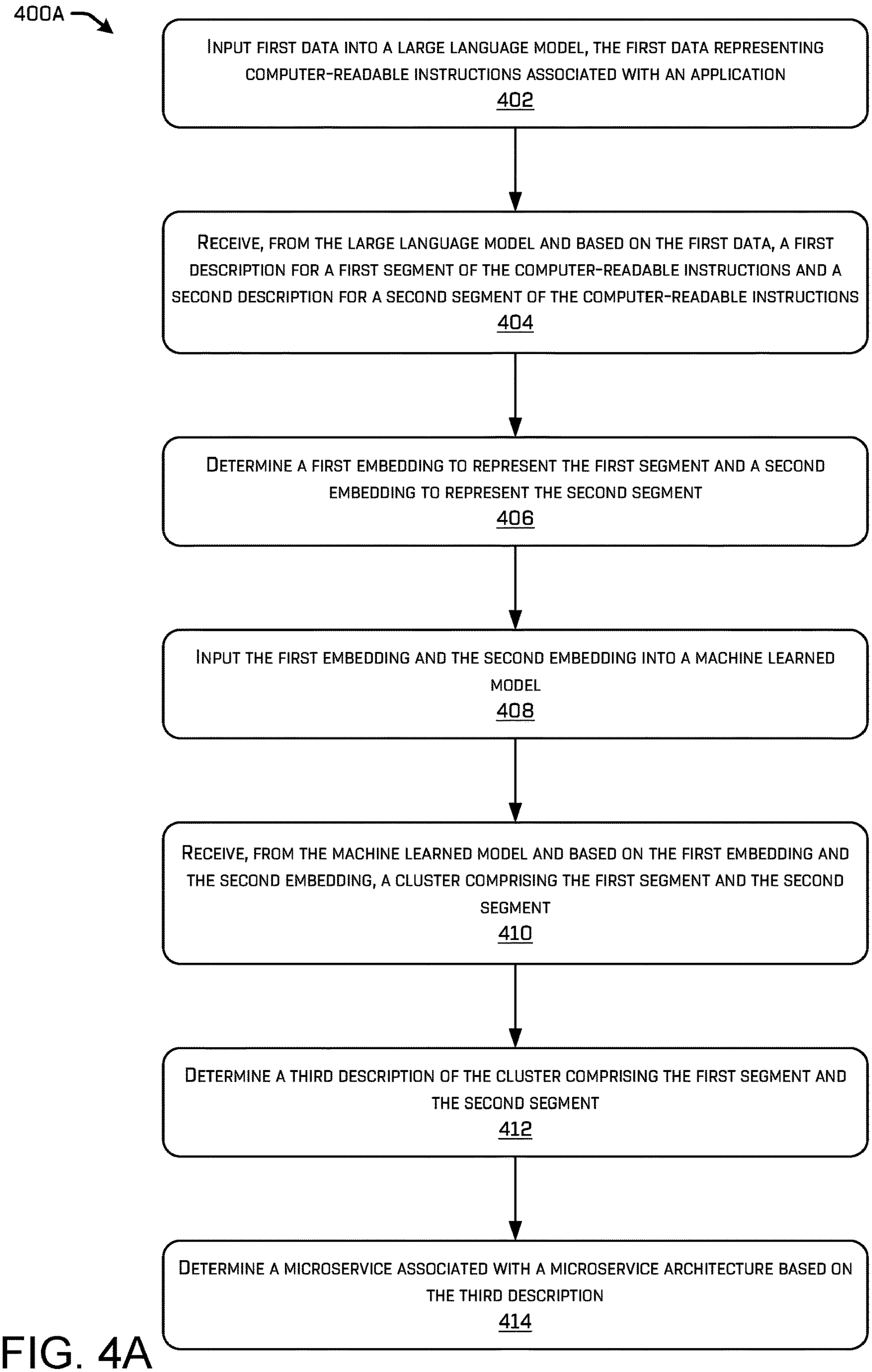
FIG. 4A is a flow diagram of an example method for determining one or more microservices based on semantic information associated with a large language model.

FIG. 4A is a flow diagram of an example method 400A for determining one or more microservices based on semantic information associated with a large language model. For example, the service provider network 102 can implement the semantic determination component 112 and/or the model(s) 114 of FIG. 1, the model component 202 of FIG. 2, and/or one or more of the first model 302, the second model 304 or the third model 306 of FIG. 3 to determine descriptions for different segments of input data. The example method 400A can include determining candidate microservices for decomposing data, migrating data, converting data, etc. based on the determined descriptions.

At 402, the computing device(s) 110 associated with the service provider network 102 may input first data into a large language model, the first data representing computer-readable instructions associated with an application. For example, the operation 402 can include the semantic determination component 112 receiving the input data 116 associated with an application including at least computer-readable instructions executable by a processor to invoke different application functionality. In some examples, the first data can indicate a request to change data associated with the application such as a request to decompose the application into microservices for use in a microservice architecture. The large language model can, in examples, receive some or all of the first data from another component, model, or service, and may include receiving segments of the computer-readable instructions for describing from a modernization service.

At 404, the semantic determination component 112 associated with the service provider network 102 may receive, from the large language model and based on the first data, a first description for a first segment of the computer-readable instructions and a second description for a second segment of the computer-readable instructions. For instance, the summarization component 204 can determine semantic information for different data fields, or sections of the computer-readable instructions. In some examples, the first description and/or the second description may be determined based on a class identifier, a class body, or a class dependency associated with a segment.

At 406, the semantic determination component 112 may determine a first embedding to represent the first segment and a second embedding to represent the second segment. For example, the optimization component 206 can determine semantic information and/or functional information for one or more of the first embedding or the second embedding.

At 408, the semantic determination component 112 may input the first embedding and the second embedding into a machine learning model. For example, the output from the large language model can be input into a graph neural network configured to implement an unsupervised algorithm to group the first segment (or first embedding) and the second segment (or second embedding) in a business domain category.

In some examples, the large language model can determine hierarchical data identifying a relationship among the first segment and the second segment, and operation 408 can include inputting the hierarchical data into the machine learning model. In various examples, the machine learning model can determine the cluster(s) based on the hierarchical data.

At 410, the computing device(s) 110 may receive, from the machine learning model and based on the first embedding and the second embedding, a cluster comprising the first segment and the second segment. For instance, the computing device(s) 110 can receive the output data 118 from one of the model(s) 114 or from one of the models of the model component 202 representing clusters of segments.

At 412, the semantic determination component 112 may determine a third description of the cluster comprising the first segment and the second segment. The naming component 208 can, for example, determine a human-readable topic for one or more of the clusters. In some examples, the third description can be transmitted to a client device for presentation on a display device.

At 414, the semantic determination component 112 may determine a microservice associated with a microservice architecture based on the third description. For example, the semantic determination component 112 can associate each cluster with a respective microservice.

FIG. 4A illustrates a flow diagram of an example method that illustrate aspects of the functions performed at least partly by the service provider network 102 as described in relation to FIG. 1 and elsewhere. The logical operations described herein with respect to FIG. 4A may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 4A as described herein. For example, the operation 406 may be omitted and the operation 408 may be performed without requiring the operation 406 and instead the second test results can be compared to the reference data. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

In some examples, the techniques of the method 400 may be performed by a system comprising one or more processors and one or more computer-readable media storing computer-executable instructions that, when executed by the one or more processors, cause the one or more processors to perform the operations of the methods.

Figure 4B:
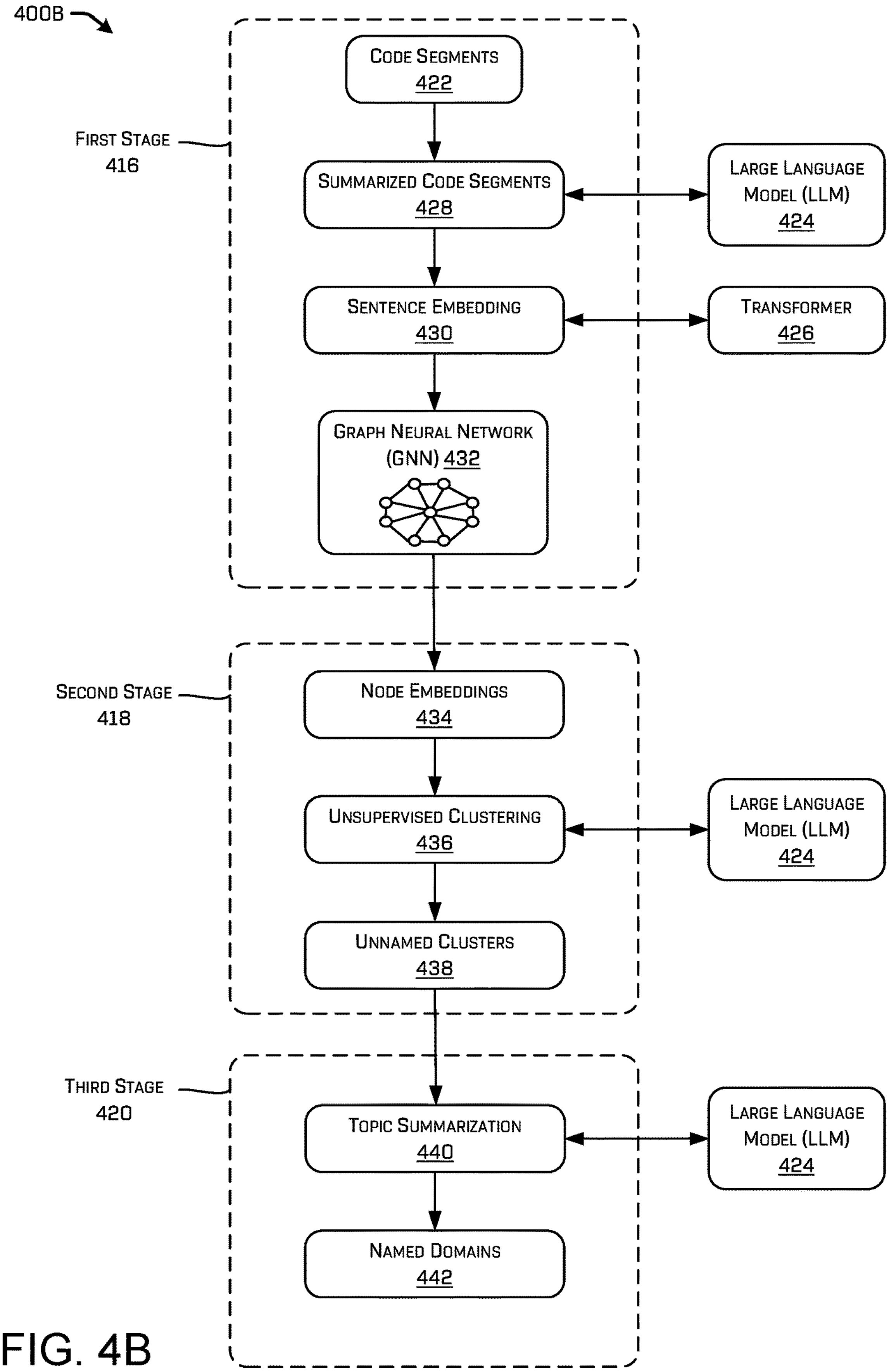
FIG. 4B is a schematic diagram of the architecture of, and data flow through, a three-stage domain-driven application decomposition system as described herein.

FIG. 4B is a schematic diagram 400B of the architecture of, and data flow through, a three-stage domain-driven application decomposition system as described herein. For example, the service provider network 102 can implement the semantic determination component 112 and/or the model(s) 114 of FIG. 1, the model component 202 of FIG. 2, and/or one or more of the first model 302, the second model 304 or the third model 306 of FIG. 3 to determine information for a domain or microservice, as described herein.

FIG. 4B shows a first stage 416, a second stage 418, and a third stage 420 (also referred to collectively as "the three stages") representing portions of a domain-driven application decomposition system. Though three stages are shown in the schematic diagram 400B, in various examples the number of stages may vary to include one or more stages and functionality associated with a stage may be included in another stage.

The first stage 416 can include inputting source code associated with code segments 422 into an LLM 424. The LLM can be incorporated into the three-stage decomposition application, or can be a separate service that is called via API. Based on receiving the code segments 422, the LLM 424 can generate summarized code segments 428 comprising text summaries describing the functionality, level of effort, and/or semantics of the code segments 422. In various examples, the LLM 424 can generate a summary for each code segment of the code segments 422. The LLM 424 can, for example, be configured to include at least the functionality of the model(s) 114, or the first model 302, as described herein.

In various examples, a code analyzer can "preprocess" received code and determine output data representing one or more of: high level context, documents, project descriptions, class id, class body, dependency, among others. In examples, different code analyzers may be used to support determining the output data regardless of a programming language associated with the received code.

The output data from the code analyzer(s) (e.g., high level context, documents, project descriptions, class id, class body, dependency, etc.) can be transmitted to the LLM 424 as input data for determining the summaries for the various code segments (e.g., the summarized code segments 428). The LLM 424 can determine semantic meaning of a code segment based on criteria such as a prompt to identify one or more of: a task specification, a context, input data, a constraint, an example, an expected output format, etc. In some examples, the LLM can leverage the high-level context, class body and dependency information from the code analyzer, for example, to dynamically generate a prompt based on a language specific prompt template.

The first stage 416 can also include a computing device implementing a transformer 426 to determine sentence embeddings 430 for one or more of the summarized code segments 428. In some examples, the transformer 426 can generate the sentence embeddings 430 independent of relaying on structural dependencies and node features (e.g., different from those generated by a GNN model node embedding implemented alone). A GNN model can represent a universal source code representation learning framework running in unsupervised mode and may be implemented as a backend service. The GNN model can include node features as the sentence embedding that may be propagated along the edges to respective neighbors based on a radius determined during training. In various examples, the node features can include the semantic embedding and topology information.

As used herein, the "topology" of a software application refers to the overall structure, organization, and interconnections between its various components or modules. It describes how different parts of the application are arranged and interact with each other. The topology of a software application can be described from different perspectives, such as logical topology describing the conceptual organization and interactions between functional components, physical topology representing the deployment and distribution across hardware/infrastructure, network topology defining the communication paths and connections between nodes, and data topology outlining the organization and relationships between data entities and storage systems and how data is structured, partitioned, replicated, or distributed across different storage systems or databases.

In some examples, an embedding model such as an autoencoder, may be used instead of or in addition to the transformer 426 (e.g., a sentence transformer). For example, the transformer 426 can support batching the input data to process input data that exceeds a threshold size and further provide efficient use of available computational resources relative to the embedding model. However, any embedding technique may be used other than or in addition to the autoencoder, a embedding, a service-hosted embedding model, and the transformer 426.

The schematic diagram 400B can include the LLM 424 generating semantic embeddings for use as initial node features (or input data) of the GNN 432. The GNN model 432 is a framework for unsupervised learning of universal node representations on heterogenous graphs. It can employ a graph neural network encoder to generate node embeddings from the input heterogeneous graph data representing the source code. It then can use a number of specialized decoder components to capture different aspects of the code's structure and properties within these embeddings. By jointly training all these decoders along with the encoder, the GNN model 432 learns node embeddings that holistically capture diverse topological patterns, semantic attributes, and relational properties present in the input source code graphs. This comprehensive encoding allows the embeddings to effectively represent rich structural and semantic code information. The GNN 432 may implement a PanRep model node representation learning (or other technique) to determine the node embeddings 434 based on the initial node features representing semantic embeddings from the LLM 424 and other node features representing the sentence embedding 430 output by the transformer 426. A node embedding of the node embeddings 434 can correspond to a class and may be represented by a vector of numerical values. In various examples, the node embedding can include both semantic information and topology information for a code segment of the code segments 422. In various examples, similarity between respective node embeddings can indicate a relationship (e.g., closeness) between two or more classes such as a first class and a second class.

The second stage 418 can include a device, component, or model performing unsupervised clustering 436 based on the node embeddings 434 obtained in the first stage 416. For example, the LLM 424 (or clustering model in some examples) can receive the node embeddings 434 as input and employ a variety of unsupervised clustering techniques including, but not limited to, unsupervised algorithms such as K-means, ordering points to identify the clustering structure (OPTICS), or Density-Based Spatial Clustering Application with Noise (DBScan), to output unnamed clusters 438. For example, unsupervised clustering 436 may include using DBScan to iteratively cluster such as executing multiple rounds of clustering with different hyperparameters (a parameter representing a maximum distance between neighbors such as epsilon (EPS) values). For instance, after determining a cluster, DBScan can cluster remaining noise nodes with at least one different hyperparameter (EPS value). Using the DBScan can enable determining an optimal number of clusters having varied granularity one to another.

In various examples, the second stage 418 can include the LLM 424 guiding unsupervised clustering 436 of the node embeddings 434 by performing a semantic analysis of the code to generate a target number of the unnamed clusters 438. A cluster of the unnamed clusters 438 can include a group of similar code segments, for example.

For example, the LLM 424 can perform semantic analysis and generate a particular number of business domain aligned clusters. The number of business domains may be used as input data for use by one of the aforementioned unsupervised algorithms (e.g., may also be referred to as using the number of clusters as "a north star" in an unsupervised algorithm). For example, the node embeddings 434 may be input along with the number of business domains to improve alignment of available microservices. In some examples, the LLM 424 can determine the number of business domains based on and/or other criteria including but not limited to a project description, document and specification, software decomposition task description, the summarized code segments 428, expected output is list of business domains, and expected format, just to name a few.

In some examples, the unsupervised clustering 436 determines a number of clusters based on receiving an optimal number of clusters such as using the number of business domains as "the north star" as mentioned. The unsupervised clustering 436 may also or instead use a K-means algorithm and use "K" as the optimal number of clusters to be determined.

In various examples, a classification model (e.g., a domain specific classification model or a general-purpose classification model) may be implemented in addition to, or in place of, the unsupervised learning 436. For example, the classification model can be used instead of the unsupervised learning 436 to classify portions of node embeddings 434 associated with a particular program language (e.g., Java).

The third stage 420 can include summarizing the code segments within an unnamed cluster of the unnamed clusters 438 into a coherent topic or domain. For example, the LLM 424 can determine topic summarization 440 for the unnamed clusters 438 including outputting named domains 442 (e.g., assigning a domain name to a particular cluster in the unnamed clusters 438). The named domains 442 can represent topic names determined by the LLM 424 which may be determined iteratively. For example, a number of classes in a particular candidate microservice can vary, and the LLM 424 can iteratively subgroup the classes within an identified cluster, then generate the topic name based on the subgroups. The named domains 442 can, in various examples, represent a business domain that is determined based on the topic name.

In examples when a size of an unnamed cluster (or code segments thereof) exceeds an input token size supported by the LLM 424, the LLM 424 can iteratively process the unnamed clusters 438. For example, the LLM 424 can reduce a size of the code segments associated with the unnamed cluster by breaking the code segments into respective smaller batch, summarizing the respective batches, and then combining or consolidating the summarized texts into distinct topics.

By including the first stage 416, the second stage 418, and the third stage 420, a domain-driven application decomposition system may be employed that analyzes the code provided as input at a more granular class level (relative to not implementing the three stages) thereby improving an understanding of individual components and their dependencies. Implementing the LLM 424 in one or more of the three stages can provide a comprehensive understanding of functionalities, patterns, level of efforts, semantic meanings, and so on, associated with the code segments 422.

In various examples, the LLM 424 and the GNN 432 (e.g., a PanRep model) can enable a holistic representation of the code segments 422. For instance, the node embedding 434 can include both the semantic meanings and the structural topology to improve performance of the unsupervised clustering 436 and/or the topic summarization 440.

By employing the three stages, models associated with each stage can be individually trained to maximize results of each stage, and ultimately improve predictions associated with the named domains 442. In various examples, the use of the LLM 424 can be thought of as a Chain Of Thoughts (CoT) solution (e.g., providing an indication of a reason for an output generated by the LLM). In some examples, the topic summarization 440 can be performed by a microservice extractor configured to name a microservice for the topics associated with the topic summarization 440.

Using the first stage 416, the second stage 418, and the third stage 420 can provide a scalable solution that does not require feeding entire source code of a project into the LLM 424 at a single time. For example, portions of the source code can be received over time and processed independent of a size of the input data (e.g., the LLM can employ batching or other techniques).

In examples, determining the named domains 442 does not depend on a type of programming language associated with the input data. Rather, the techniques are programming language agnostic and may process input data associated with C# and/or Java, for example.

By way of example and not limitation, an LLM may generate "domain specific" predictions during decomposition of input data. For instance, an LLM can be configured to identify a subdomain of the domain in the code segments 422 for micro-service decomposition. In some examples, a preprocessing component can receive the input data (e.g., source code) and "clean" the source code by removing any irrelevant or redundant information. The preprocessing component may also or instead convert the source code from a first format to a second format usable as input data into the LLM for training, or fine-tuning.

The LLM may be trained to generate "domain specific" predictions based on determining a dataset of a collection of code snippets (also referred to as segments or portions) associated with various domains of different applications. The dataset may represent, for example, a mapping between some of the code snippets and various business domains, and may be included as training data to train the LLM. In some examples, the dataset made be generated using a model and/or open-source application. For example, a modeling tool can generate the dataset based on a transfer learning technique from another LLM and/or manual labels (human generated), and/or device labels (device generated).

In various examples, supervised fine-tuning the LLM may include training the LLM based at least in part on the dataset. For example, the LLM can be trained to detect semantic relationships between the different code snippets in the dataset and the business domain descriptions over time. In some examples, an updated dataset can be received after a first training of the LLM to detect new relationships between code snippets and domain names for second training after the first training.

After the LLM is trained (or fine-tuned), the trained LLM can receive code snippets associated with input data (e.g., an application), and generate corresponding domain descriptions, clustering similar domain descriptions into a microservice candidate for decomposing the application. By preprocessing the code snippets into particular business domains, and then training the LLM as described herein, functionality associated with the trained LLM can be available as a service via an API call for domain-driven microservice decomposition. In various examples, output data by the LLM can be used as training data to improve performance of the LLM over time. In some examples, the output data can be validated by a user (e.g., customer feedback) and the validated data may be used to train the LLM using reinforcement learning or another technique. Training over time can improve outputs by the LLM with enables a better understanding of the semantics and context of the code associated with a domain. The LLM may, for example, be trained to identify semantic relationships between code snippets and corresponding business domain descriptions over time.

Figure 5:
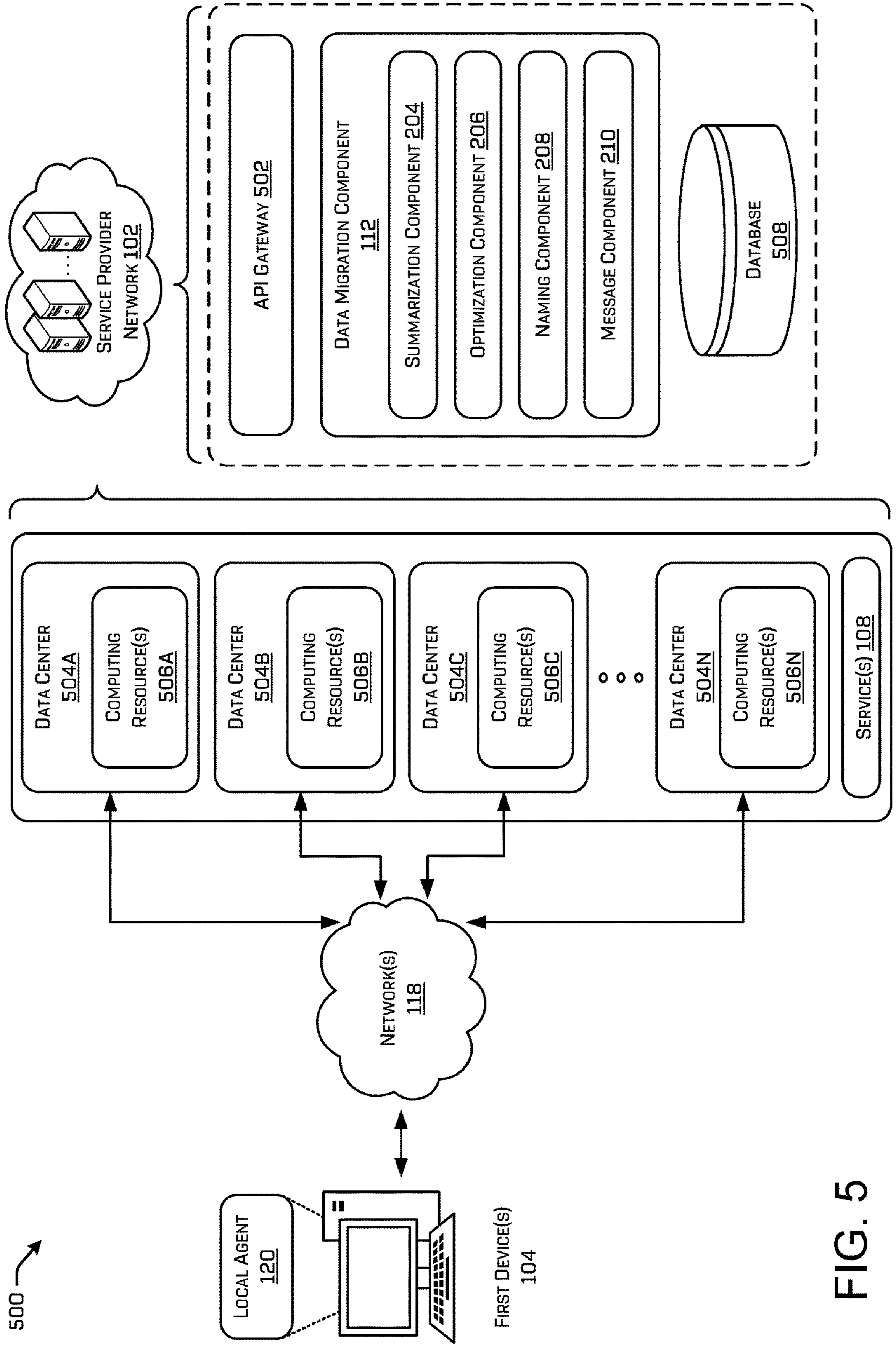
FIG. 5 illustrates a system and network diagram of an example operating environment that includes a service provider network for implementing the techniques described herein.

FIG. 5 illustrates a system and network diagram 500 of an example operating environment that includes a service provider network (that may be part of or associated with a cloud-based service network/platform) for implementing the techniques described herein. The service provider network 102 can include an API gateway 502 that may receive an API call and route the API call to a component or service. In various examples, the service provider network 102 can include the semantic determination component 112 which comprises the summarization component 204, the optimization component 206, the naming component 208, and/or the message component 210.

The service provider network 102 can provide computing resources (e.g., computational resource(s) 506A, computational resource(s) 506B, computational resource(s) 506C up to an Nth computational resource(s) 506N (collectively "computational resources 506", where N can be any integer greater than 1) like VM instances, containers, serverless functions, storage, etc., on a permanent or an as-needed basis. Among other types of functionality, the computing resources 506 provided by the service provider network 102 may be utilized to implement the various cloud-based services. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. As shown, the service provider network 102 can include a database 508 for use in association with the data management techniques discussed herein. The service provider network 102 can also be configured to provide other types of computing resources not mentioned specifically herein.

The computing resources 506 provided by the service provider network 102 may be enabled in one example by one or more data centers 504A-504N (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative example for a data center 504 that can be utilized to implement the technologies disclosed herein will be described below with regard to FIG. 7.

The data centers 504 may be configured in different arrangements depending on the service provider network 102. For example, one or more data centers 504 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

A cloud provider network can be formed as a number of regions, where a region is a separate geographical area in which the cloud provider clusters data centers. In many cases, each region represents a geographic area (e.g., a U.S. East region, a U.S. West region, an Asia Pacific region, and the like) that is physically separate from other regions. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). In some implementations, the cloud provider network can include one or more cellular networks (such as a public or private 4G, 5G, or other "G" network) that run at least partly on the cloud's infrastructure. This compartmentalization and geographic distribution of computing hardware enables the cloud provider network to provide low-latency resource access to customers on a global scale with a high degree of fault tolerance and stability.

The users and/or admins of the service provider network 102 may access the computing resources 506 provided by the data centers 504 of the service provider network 102 over any wired and/or wireless network(s) 124 (utilizing the client device 104, a client device, and/or another accessing-user device), which can be a wide area communication network ("WAN"), such as the Internet, an intranet or an Internet service provider ("ISP") network or a combination of such networks. For example, and without limitation, a device operated by a user of the service provider network 102 may be utilized to access the service provider network 102 by way of the network(s) 124. It should be appreciated that a local-area network ("LAN"), the Internet, or any other networking topology known in the art that connects the data centers 504 to remote clients and other users can be utilized. It should also be appreciated that combinations of such networks can also be utilized.

In a distributed computing environment, such as the one included in the service provider network 102 (e.g., computing-resource network), a fleet of VM instances and/or servers may have workflow or processes executed thereon to manage resources. For instance, a patch may need to be installed on each VM instance and/or resource at a particular time. In such distributed applications of workflows or processes, a load balancer may be at the front end in front of the fleet of servers where a request for a workflow comes in, and the load balancer distributes the request to execute the workflow amongst the servers.

Figure 6:
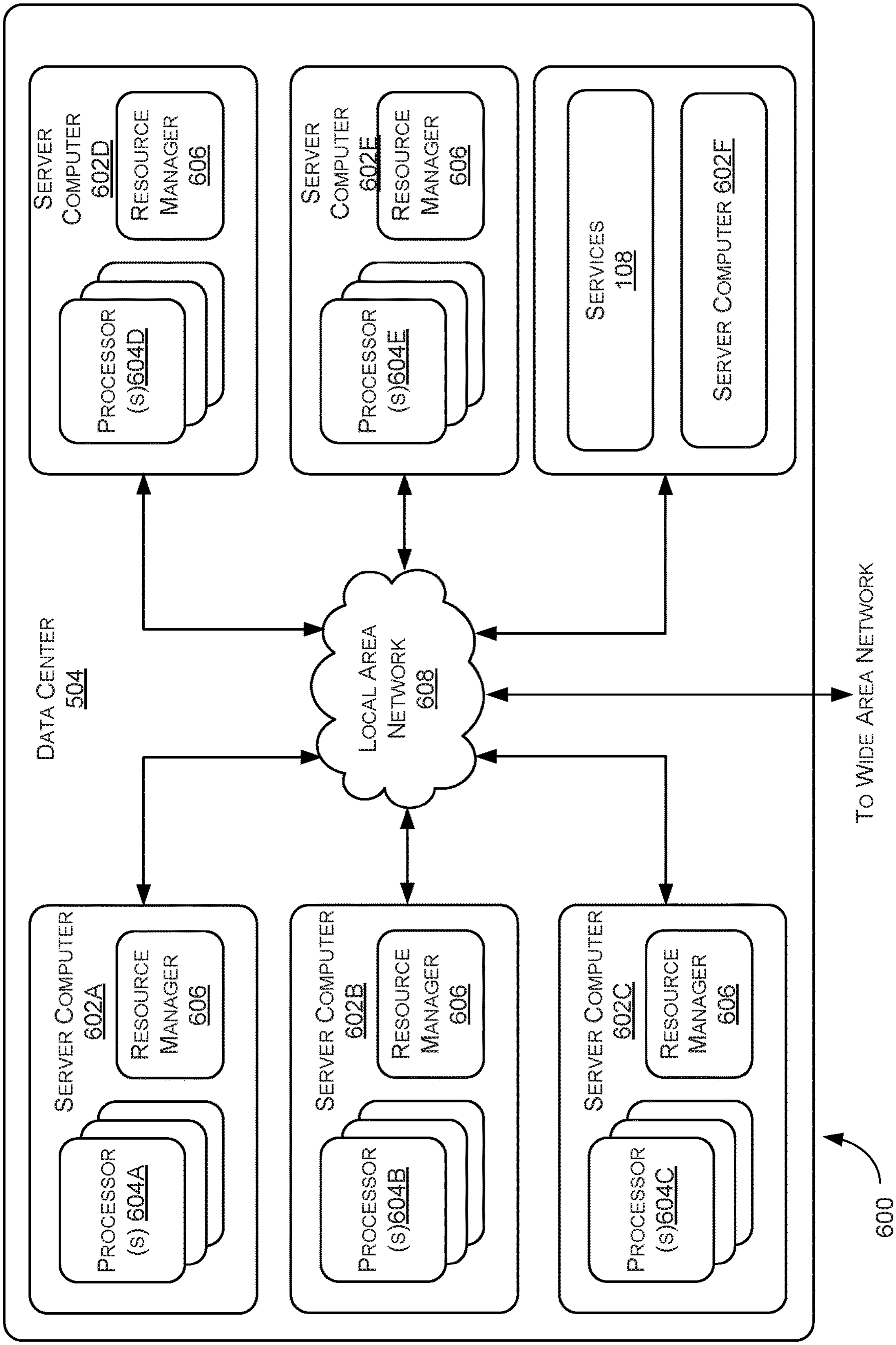
FIG. 6 is a diagram illustrating a configuration for an example data center that can be utilized to implement aspects of the techniques disclosed herein.

FIG. 6 is a diagram 600 illustrating a configuration for an example data center that can be utilized to implement aspects of the techniques disclosed herein. The example data center 504 shown in FIG. 5 includes several server computers 602A-602F (which might be referred to herein singularly as "a server computer 602" or in the plural as "the server computers 602") each having one or more processors 604A, 604B, 604C, 604D, and 604E. In some examples, the processor(s) 604 can represent a central processing unit (CPU), a graphics processing unit (GPU), a Tensor Processing Unit (TPU), an integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

The server computers 602 can be standard tower, rack-mount, or blade server computers configured appropriately for providing the computing resources described herein (illustrated in FIG. 6 as the processor(s) 604A-604E). As mentioned above, the computing resources provided by the service provider network 102 can be data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 504 can also be configured to provide network services and other types of services, some of which are described in detail below with regard to FIG. 6.

The data center 504 shown in FIG. 6 also includes a server computer 602F that can execute some or all of the software components described above. For example, and without limitation, the server computer 602F can be configured to execute components of the service provider network 102, including the services 108.

In the example data center 504 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504N, between each of the server computers 602A-602F in each data center 504, and, potentially, between computing resources in each of the server computers 602. It should be appreciated that the configuration of the data center 504 described with reference to FIG. 6 is merely illustrative and that other implementations can be utilized.

Figure 7:
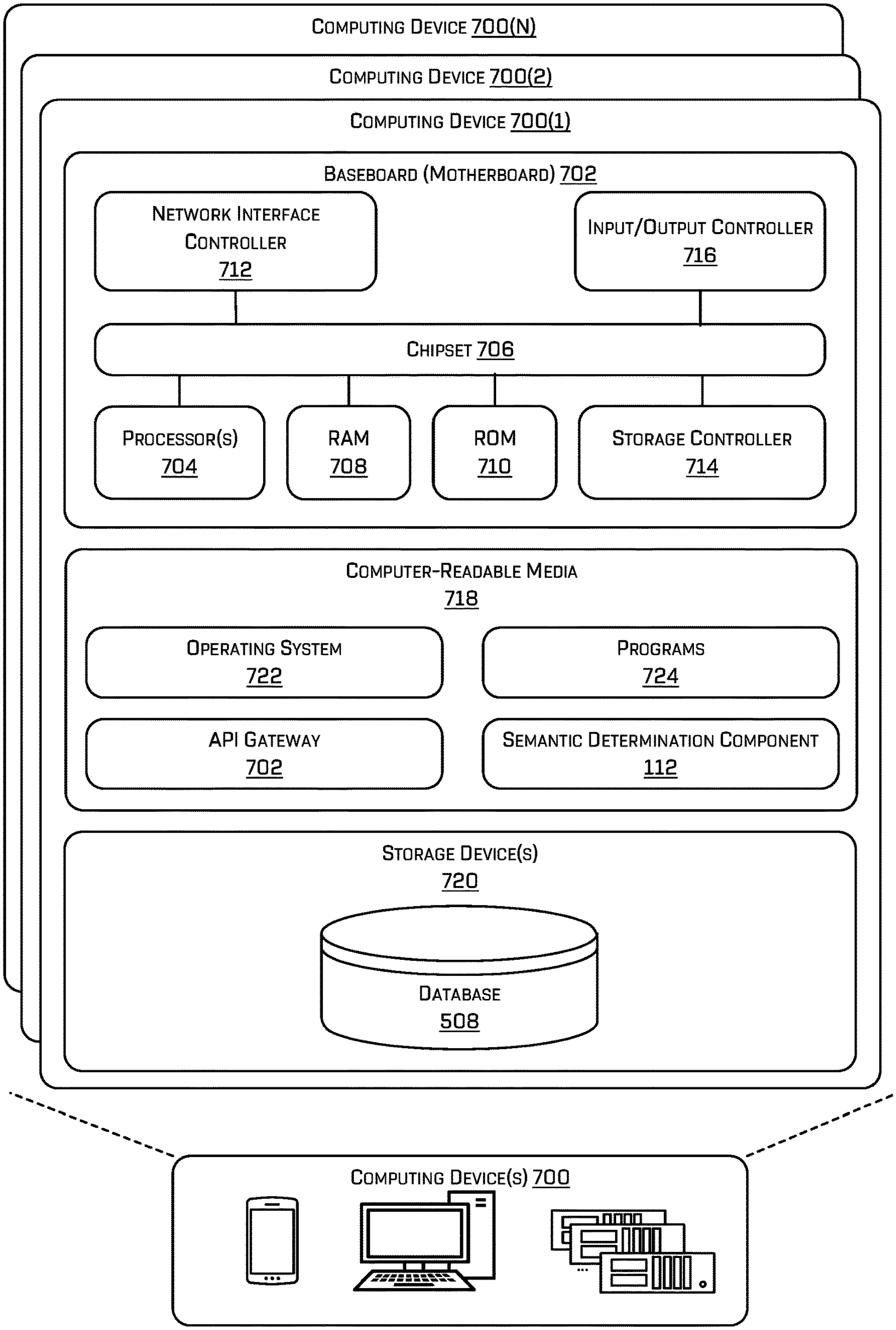
FIG. 7 is a computer architecture diagram showing an illustrative computer hardware architecture for implementing one or more computing devices to perform the techniques disclosed herein.

FIG. 7 is a computer architecture diagram showing an illustrative computer hardware architecture for implementing one or more computing devices 700 to perform the techniques disclosed herein. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computing device 700 includes a baseboard 702, or "motherboard," which is a printed circuit board to which a multitude of components or devices can be connected by way of a system bus or other electrical communication paths. In one illustrative configuration, one or more processor(s) 704 (e.g., CPU, GPU, TPU, and the like) operate in conjunction with a chipset 706. The processor(s) 704 can be standard programmable processors that perform arithmetic and logical operations necessary for the operation of the computing device 700. The processor(s) 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the processor(s) 704 and the remainder of the components and devices on the baseboard 702. The chipset 706 can provide an interface to a RAM 708, used as the main memory in the computing device 700. The chipset 706 can further provide an interface to a computer-readable storage medium such as a read-only memory ("ROM") 710 or non-volatile RAM ("NVRAM") for storing basic routines that help to startup the computing device 700 and to transfer information between the various components and devices. The ROM 710 or NVRAM can also store other software components necessary for the operation of the computing device 700 in accordance with the configurations described herein.

The computing device 700 can operate in a networked environment using logical connections to remote computing devices and computer systems through a network, such as the network(s) 124. The chipset 706 can include functionality for providing network connectivity through a network interface controller (NIC 712), such as a gigabit Ethernet adapter. The NIC 712 is capable of connecting the computing devices 700 over the network(s) 124. It should be appreciated that multiple NICs 712 can be present in the computing device 700, connecting the computer to other types of networks and remote computer systems.

The computing device 700 can be connected to one or more computer-readable storage media 718 storing software components for the computer device 700, and one or more mass storage devices 720 for storing data. The computer-readable storage media 718 can store an operating system 722, programs 724, the API gateway 502, and the semantic determination component 112, which have been described in greater detail herein. The mass storage device 720 can be connected to the computing device 700 through a storage controller 714 connected to the chipset 706. The mass storage device 720 can consist of one or more physical storage units. The storage controller 714 can interface with the physical storage units through a Small Computer System Interface ("SCSI"), a serial attached SCSI ("SAS") interface, a serial advanced technology attachment ("SATA") interface, a fiber channel ("FC") interface, or other type of interface for physically connecting and transferring data between computers and physical storage units.

Generally, the computer-readable storage media 718 may store the components described herein as executable, computer-readable instructions. For instance, the components may include the API gateway 502, the model component 202, the semantic determination component 112, or components associated with the semantic determination component 112. The components may be stored on and/or executed by a single server, or a system of two or more computing devices 700.

The computing device 700 can store data on the mass storage device 720 by transforming the physical state of the physical storage units to reflect the information being stored. The specific transformation of physical state can depend on various factors, in different examples of this description. Examples of such factors can include, but are not limited to, the technology used to implement the physical storage units, whether the mass storage device 720 is characterized as primary or secondary storage, and the like.

For example, the computing device 700 can store information to the mass storage device 720 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 can further read information from the mass storage device 720 by detecting the physical states or characteristics of one or more particular locations within the physical storage units.

In addition to the mass storage device 720 described above, the computing device 700 can have access to the computer-readable storage media 718 to store and retrieve information, such as program modules, event structures, or other data. It should be appreciated by those skilled in the art that computer-readable storage media is any available media that provides for the non-transitory storage of data and that can be accessed by the computing device 700. In some examples, the operations performed by the service provider network 102, and or any components included therein, may be supported by one or more devices similar to computing device 700. Stated otherwise, some or all of the operations performed by the service provider network 102, and or any components included therein, may be performed by one or more computer devices 700 operating in a cloud-based arrangement. As shown, the mass storage device 720 may store the database 508 that includes information about meeting data, sensor data, user profiles, and services as well as rules and access policies.

By way of example, and not limitation, computer-readable storage media 718 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disc ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 720 can store an operating system 722 utilized to control the operation of the computing device 700. According to one example, the operating system comprises the LINUX operating system. According to another example, the operating system comprises the WINDOWS® SERVER operating system from MICROSOFT Corporation of Redmond, Washington. According to further examples, the operating system can comprise the UNIX operating system or one of its variants. It should be appreciated that other operating systems can also be utilized. The mass storage device 720 can store other system or application programs and data utilized by the computing device 700.

In one example, the mass storage device 720 or other computer-readable storage media 718 is encoded with computer-executable instructions which, when loaded into the computing device 700, transform the computer from a general-purpose computing system into a special-purpose computer capable of implementing the examples described herein. These computer-executable instructions transform the computing device 700 by specifying how the processor(s) 704 transition between states, as described above. According to one example, the computing device 700 has access to computer-readable storage media storing computer-executable instructions which, when executed by the computing device 700, perform the various processes described above with regard to FIGS. 1-7. The computing device 700 can also include computer-readable storage media having instructions stored thereupon for performing any of the other computer-implemented operations described herein.

The computing device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 700 might not include all of the components shown in FIG. 7, can include other components that are not explicitly shown in FIG. 7, or might utilize an architecture completely different than that shown in FIG. 7.

In various examples, the service provider network may be part of or associated with a cloud-based service network that can be configured to implement aspects of the functionality described herein.

The service provider network 102 can provide computing resources, like physical servers, VM instances, containers, serverless functions, network functions, and storage, on a permanent or an as-needed basis. Among other types of functionality, the computing resources provided by the service provider network 102 may be utilized to implement the various services described above. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 504 (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations.

Figure 8:
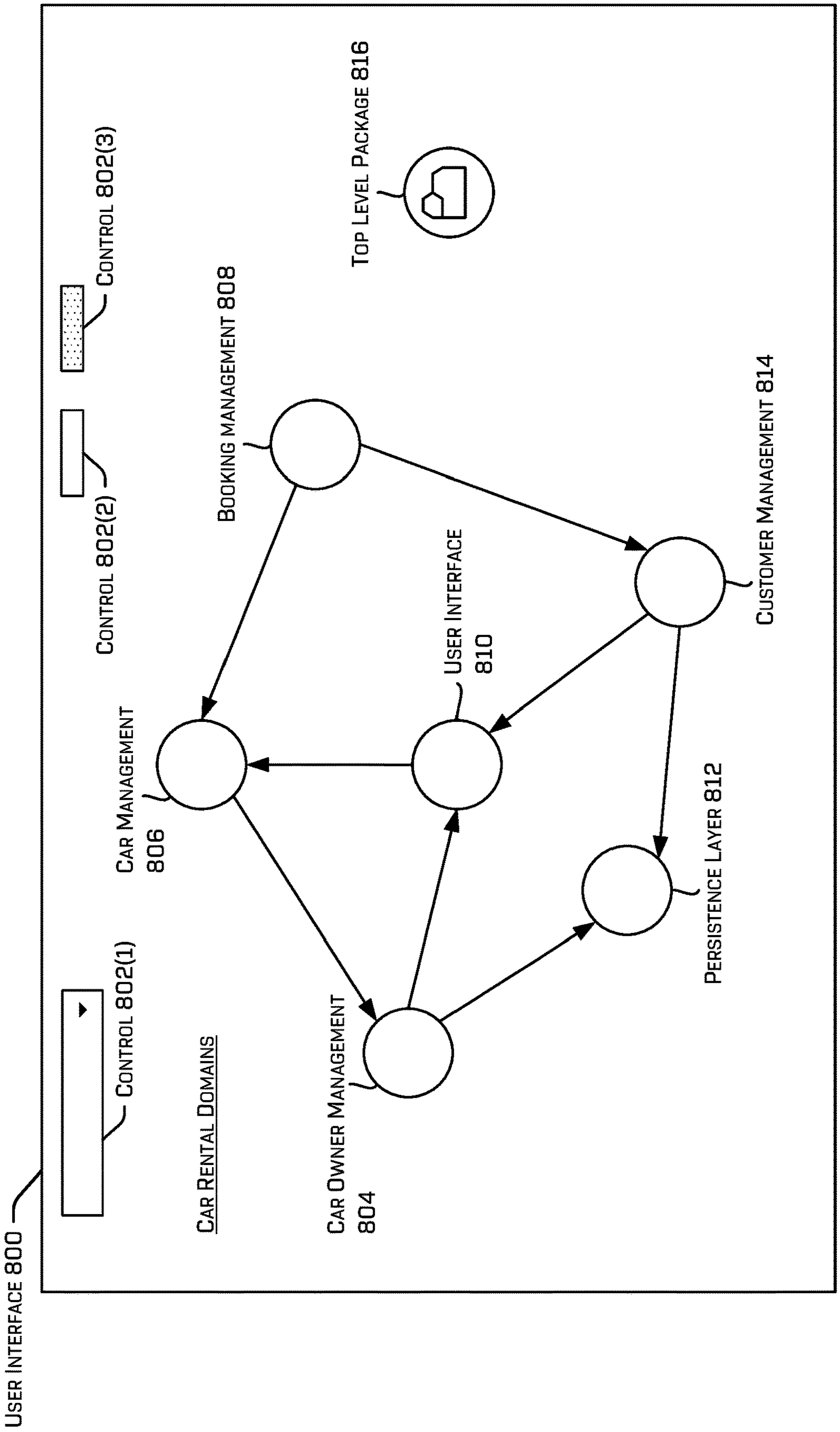
FIG. 8 is an example user interface for implementing the techniques described herein.

FIG. 8 is an example user interface 800 for implementing the techniques described herein. For example, the user interface 800 of a computer device can include a human readable description for each microservice in a set of microservices identified for decomposing data as well as various controls for a user (e.g., a customer, administrator, etc.) to interact with the microservices. By outputting a user interface that provides candidate microservices and enables interaction with such microservices, the techniques described herein may reduce an amount of time for a user to decide to initiate decomposing the input data. This improves "last mile" decision making by providing data in the user interface 800 that quickly enables the user to understand the scope of a decomposition project. Additionally, the techniques described herein may allow for customer feedback to improve determination by a model or component described herein.

A computing device (e.g., the client device(s) 104 and/or the computing device(s) 110) can comprise the user interface 800. As shown in the example of FIG. 8, the user interface 800 comprises controls 802(1), 802(2), and 803(3), (collectively referred to as "controls 802") to invoke different functionality based on receiving a user input. Any number of controls may be included and the control type may vary whether a drop down menu, among others. Various controls may appear as visual indicators that are selectable to invoke different functionality such as to select a microservice to invoke an action such as to review class dependencies, embedding relationships, etc. Controls may also enable zooming, filtering, or the like. In some examples, one of the controls can be used to generate a new microservice or grouping of microservices, perform an action relative to the microservice (e.g., approve or reject a microservice name, inclusion in a project, etc.), show details of the code segments, embeddings, nodes, or the like included in or otherwise associated with a microservice, etc.

FIG. 8 depicts various microservices associated with input data for an example car rental decomposition project. Car rental domains can include, for example, car owner management microservice 804, car management microservice 806, booking management microservice 808, user interface microservice 810, persistence layer microservice 812, and customer management microservice 814. The user interface 800 further depicts a top level package 816 representing additional information associated with one or more projects. One or more of the car owner management microservice 804, car management microservice 806, booking management microservice 808, user interface microservice 810, persistence layer microservice 812, and customer management microservice 814 may represent a control that is selectable for receiving additional information about a respective microservice.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Similarly, a "set" includes one or more of the specified components.

What is claimed is:

1. A system comprising:

a large language model (LLM);

a graph neural network (GNN);

a clustering model; and a microservice extractor executing on a set of computing devices, the microservice extractor configured to perform operations comprising:

receiving, from a computing device at a first time, a request to transform at least a portion of a monolithic application from a first data format to a second data format;

inputting source code of the monolithic application into the LLM at a second time after the first time based at least in part on receiving the request at the first time;

using the LLM to generate descriptions of respective segments of the source code of the monolithic application;

using the GNN to generate, based at least partly on the descriptions of the respective segments of the source code, node embeddings representing both semantic and topological information of the respective segments;

using the clustering model to identify, from the node embeddings, a set of clusters of the respective segments of the source code;

using the LLM to generate natural language descriptions of respective clusters in the set of clusters; and causing output, to a user of a software application, of a decomposition proposal recommending a set of microservices that the monolithic application can be decomposed into, the set of microservices corresponding to the set of clusters, wherein the decomposition proposal includes the natural language descriptions of the respective clusters.

2. The system of claim 1, wherein:

the GNN implements a clustering algorithm to group at least some of the respective segments of the source code into a business domain category, and one of the natural language descriptions describes the business domain category.

3. The system of claim 1, wherein:

the source code is associated with an application, and determining a microservice architecture for the application based at least in part on outputting the set of microservices to a user interface of a computing device to indicate information associated with the set of microservices.

4. The system of claim 1, the operations further comprising:

determining hierarchical data identifying a relationship among two or more of the respective segments of the source code;

inputting the hierarchical data into the clustering model; and determining the set of clusters based at least in part on the hierarchical data.

5. The system of claim 1, wherein:

the descriptions of the respective segments of the source code describe a function or a meaning of the respective segments.

6. The system of claim 1, wherein the respective segments include a first segment and a second segment, and the operations further comprising:

determining a first embedding to represent the first segment and a second embedding to represent the second segment, the first embedding or the second embedding identifying semantic information and functional information associated with the second segment; and determining, by the clustering model, the set of clusters based at least in part on the first embedding and the second embedding.

7. The system of claim 1, the operations further comprising:

causing output of the natural language descriptions to the computing device for display in a user interface to indicate the topic associated with the respective clusters and the estimated time to transform the source code using a microservice architecture.

8. A computer-implemented method for extracting semantic business domains from source code to enable domain-driven microservice decomposition, the method comprising:

obtaining source code comprising code segments;

summarizing and encoding the source code at least partly by:

generating, by a large language model (LLM), natural language summaries and semantic embeddings for respective code segments; and performing graph neural network based node representation learning by utilizing the semantic embeddings as initial node features to produce, for the respective code segments, node embeddings encoding both semantic information and structural information;

determining a first embedding to represent a first segment of the code segments and a second embedding to represent a second segment of the code segments, the first embedding or the second embedding identifying semantic information and functional information associated with the second segment;

clustering the node embeddings to group the code segments into clusters, wherein a target number of clusters is determined based at least in part on semantic analysis by the LLM;

determining, by a clustering model, the clusters based at least in part on the first embedding and the second embedding;

summarizing, as summarized business domain topics and by the LLM, business domain topics represented by respective clusters of code segments; and outputting the summarized business domain topics to facilitate decomposition of the source code into microservices aligned with the business domain topics.

9. The computer-implemented method of claim 8, wherein:

obtaining the source code comprises receiving, from a computing device at a first time, a request to transform at least a portion of an application from a first data format to a second data format; and summarizing and encoding the source code at a second time after the first time based at least in part on receiving the request.

10. The computer-implemented method of claim 8, wherein:

the source code is associated with an application, at least one of the clusters represents a microservice of a microservice architecture, and the summarized business domain topics describe the microservice for transforming the application.

11. The computer-implemented method of claim 8, wherein outputting the summarized business domain topics to facilitate decomposition of the source code into the microservices comprises outputting a user interface for receiving a user input to manage at least one of the microservices.

12. One or more non-transitory computer-readable media storing instructions executable by one or more processors, wherein the instructions, when executed, cause the one or more processors to perform operations comprising:

using a large language model (LLM) to output first data representing a first description for a first segment of source code and a second description for a second segment of the source code;

using a clustering model to determine a cluster comprising the first segment and the second segment based at least in part on the first description and the second description;

using the LLM to determine a natural language description of the cluster comprising the first segment and the second segment, the natural language description describing a topic associated with the cluster and an estimated time to transform the source code; and causing output of the natural language description to a computing device for display in a user interface to indicate the topic associated with the cluster and the estimated time to transform the source code using a microservice architecture.

13. The one or more non-transitory computer-readable media of claim 12, the operations further comprising:

using a graph neural network (GNN) to determine a first embedding to represent the first segment and a second embedding to represent the second segment, the first embedding or the second embedding identifying semantic information and functional information associated with the second segment;

causing the first embedding and the second embedding to be input into the clustering model for determining the cluster.

14. The one or more non-transitory computer-readable media of claim 12, the operations further comprising:

receiving, from a computing device at a first time, a request to transform at least a portion of a monolithic application from a first data format to a second data format; and causing the LLM to generate the natural language description at a second time after the first time based at least in part on receiving the request.

15. The one or more non-transitory computer-readable media of claim 12, wherein:

the natural language description is human-readable, and the clustering model implements a clustering algorithm to group the first segment and the second segment in a business domain category, and the natural language description describes the business domain category.

16. The one or more non-transitory computer-readable media of claim 12, wherein:

the cluster represents a microservice of the microservice architecture, and the natural language description describes the microservice for transforming an application.

17. The one or more non-transitory computer-readable media of claim 12, the operations further comprising:

determining hierarchical data identifying a relationship among the first segment and the second segment;

inputting the hierarchical data into the model; and determining the cluster is further based at least in part on the hierarchical data.

18. The one or more non-transitory computer-readable media of claim 12, wherein the source code is associated with an application, and further comprising:

determining the microservice architecture for the application based at least in part on causing the output of the natural language description in the user interface.

19. The one or more non-transitory computer-readable media of claim 12, the operations further comprising:

receiving an indication to migrate the source code from a first platform to a second platform.

20. The one or more non-transitory computer-readable media of claim 12, the operations further comprising:

using a graph neural network (GNN) to determine a first embedding to represent the first segment and a second embedding to represent the second segment, the first embedding or the second embedding identifying semantic information and functional information associated with the second segment; and causing the first embedding and the second embedding to be input into the clustering model for determining the cluster.

* * * * *